(12) United States Patent
Faragher et al.

(10) Patent No.: US 10,816,672 B2
(45) Date of Patent: Oct. 27, 2020

(54) METHOD AND SYSTEM FOR CORRECTING THE FREQUENCY OR PHASE OF A LOCAL SIGNAL GENERATED USING A LOCAL OSCILLATOR

(71) Applicant: Focal Point Positioning Limited, Cambridge, Cambridgeshire (GB)

(72) Inventors: Ramsey Faragher, Cambridge (GB); Nicolas Couronneau, Bristol (GB); Robert Mark Crockett, St. Albans (GB); Peter Duffett-Smith, Huntington (GB)

(73) Assignee: Focal Point Positioning Ltd., Cambridge (GB)

( * ) Notice: Subject to any disclaimer, the term of this patent is extended or adjusted under 35 U.S.C. 154(b) by 0 days.

(21) Appl. No.: 15/822,475

(22) Filed: Nov. 27, 2017

(65) Prior Publication Data

US 2019/0011569 A1 Jan. 10, 2019

(30) Foreign Application Priority Data

Jul. 6, 2017 (GB) .................................. 1710894.5

(51) Int. Cl.
*G01S 19/29* (2010.01)
*G01S 19/22* (2010.01)
(Continued)

(52) U.S. Cl.
CPC ............ *G01S 19/29* (2013.01); *G01C 21/165* (2013.01); *G01S 19/05* (2013.01); *G01S 19/22* (2013.01);
(Continued)

(58) Field of Classification Search
CPC ........ G01S 19/22; G01S 19/246; G01S 19/29; G01S 19/53; G01S 19/235; H03L 9/00; H03J 2200/11–13
See application file for complete search history.

(56) References Cited

U.S. PATENT DOCUMENTS 6,127,970 A    10/2000  Lin
6,313,786 B1*  11/2001  Sheynblat ............... G01S 19/22
                                                    342/357.23

(Continued)

FOREIGN PATENT DOCUMENTS

CN      104597460      5/2015
EP       1574875      9/2005
(Continued)

OTHER PUBLICATIONS

English translation of CN 104597460 A.*
(Continued)

*Primary Examiner* — Bernarr E Gregory
*Assistant Examiner* — Fred H Mull
(74) *Attorney, Agent, or Firm* — Smith Baluch LLP

(57) ABSTRACT

A positioning device (4) is disclosed comprising at least one antenna (14, 16) for receiving ranging signals, such as GNSS signals. The device comprises a local oscillator (18) for providing a local frequency or phase reference and an inertial sensor (22) for measuring a movement of the device. A processor (36) is provided for performing calculations. The device can receive a first reference signal at a known or predictable frequency or phase. A local oscillator offset determination module (26) is provided to calculate an offset to the received frequency or the received phase based on the movement of the receiver in the direction of the first reference source. A local signal generator (28) can then use the local frequency or phase reference from the local oscillator (18), and the offset calculated by the local oscillator
(Continued)

offset determination module (26), to provide a local signal using a local signal generator (28). The local signal can be correlated against a received ranging signal for use in positioning calculations performed by a positioning calculator (34).

20 Claims, 14 Drawing Sheets

(51) Int. Cl.
G01S 19/24 (2010.01)
G01C 21/16 (2006.01)
G01S 19/26 (2010.01)
G01S 19/23 (2010.01)
G01S 19/05 (2010.01)

(52) U.S. Cl.
CPC .......... *G01S 19/235* (2013.01); *G01S 19/246* (2013.01); *G01S 19/26* (2013.01)

(56) References Cited

U.S. PATENT DOCUMENTS

| 6,397,146 | B1 | 5/2002 | Bruner |
| 10,321,430 | B2 | 6/2019 | Faragher et al. |
| 2002/0015439 | A1 | 2/2002 | Kohli et al. |
| 2002/0146065 | A1 | 10/2002 | Kohli et al. |
| 2003/0068977 | A1* | 4/2003 | King ............... G01S 19/235 455/12.1 |
| 2004/0107072 | A1* | 6/2004 | Dietrich ............... G01S 19/53 702/153 |
| 2004/0150557 | A1 | 8/2004 | Ford et al. |
| 2005/0065723 | A1 | 3/2005 | Bye |
| 2006/0071851 | A1* | 4/2006 | Graas ............... G01S 19/29 342/357.395 |
| 2007/0118286 | A1 | 5/2007 | Wang et al. |
| 2008/0068263 | A1 | 3/2008 | Tekawy et al. |
| 2008/0133135 | A1 | 6/2008 | Diesposti et al. |
| 2010/0073227 | A1 | 3/2010 | Waters |
| 2010/0117884 | A1 | 5/2010 | Ahmed et al. |
| 2010/0304761 | A1 | 12/2010 | Seibert et al. |
| 2011/0206090 | A1 | 8/2011 | Kubrak et al. |
| 2011/0279317 | A1 | 11/2011 | Shah |
| 2012/0050103 | A1 | 3/2012 | Revol |
| 2012/0086606 | A1 | 4/2012 | Mathews |
| 2013/0137468 | A1 | 5/2013 | Kahle et al. |
| 2014/0340258 | A1 | 11/2014 | Nagano |
| 2015/0378025 | A1* | 12/2015 | Kim ............... G01S 19/22 342/357.4 |
| 2017/0090037 | A1* | 3/2017 | Ledvina ............... G01S 19/29 |

FOREIGN PATENT DOCUMENTS

| GB | 2412037 A | * | 9/2005 | ............ H03J 1/0008 |
| GB | 2509343 A | | 7/2014 | |
| WO | 0049695 A1 | | 8/2000 | |
| WO | WO 03/032516 | | 4/2003 | |
| WO | 2006137904 A2 | | 12/2006 | |

OTHER PUBLICATIONS

A.J. Van Dierendonck, GPS Relievers, in B.W. Parkinson et al., Global Positioning System: Theory and Applications, vol. 1; Progress in Astronautics and Aeronautics, vol. 163, American Institute of Aeronautics and Astronautics, Inc., p. 329-407, 1996 (Year: 1996).*
T.N. Osterdock et al., Using a new GPS frequency reference in frequency calibration operations, 1993 IEEE International Frequency Control Symposium, p. 33-39, Jun. 1993 (Year: 1993).*
UK Intellectual Property Office, UK Search Report, GB1710894.5; dated Nov. 15, 2017. 3 pages.
Takeyama, Kojiro et al., "Precise Dead-reckoning Using Portable Navigation Device in Urban Environments", ITM 2015—Prodeedings of the 2015 International Technical Meeting of the Institute of Navigation; Jan. 28, 2015, pp. 608-613.
European Patent Office, International Search Report and Written Opinion for PCT/GB2018/051803, dated Oct. 1, 2018, 15 pages.
Broumandan A., et al., "Direction of Arrival Estimation of GNSS Signals Based on Synthetic Antenna Array," 2007 Institute of Navigation (ION) Global Navigation Satellite System (GNSS) Conference, Sep. 2007, 11 pages.
International Search Report—Application No. PCT/GB2017/050778, dated May 30, 2017, 12 pages, together with the Written Opinion of the International Searching Authority.
Kubrak D., et al., "Performance Analysis of MEMS Based Pedestrian Navigation Systems," ION GNSS 18th International Technical Meeting of the Satellite Division, Sep. 2005, pp. 2976-2986.
Niedermeier H., et al., "DINGPOS: High Sensitivity GNSS Platform for Deep Indoor Scenarios," 2010 International Conference on Indoor Positioning and Indoor Navigation (IPIN), Sep. 2010, 10 pages.
Pany et al., "Coherent integration Time: The Longer, the Better," InsideGNSS, Nov./Dec. 2000, pp. 52-61.
United Kingdom Intellectual Property Office, Combined Search and Examination Report under Section 17 & 18(3)—Application No. GB1605044.5, dated May 5, 2016, 7 pages.

* cited by examiner

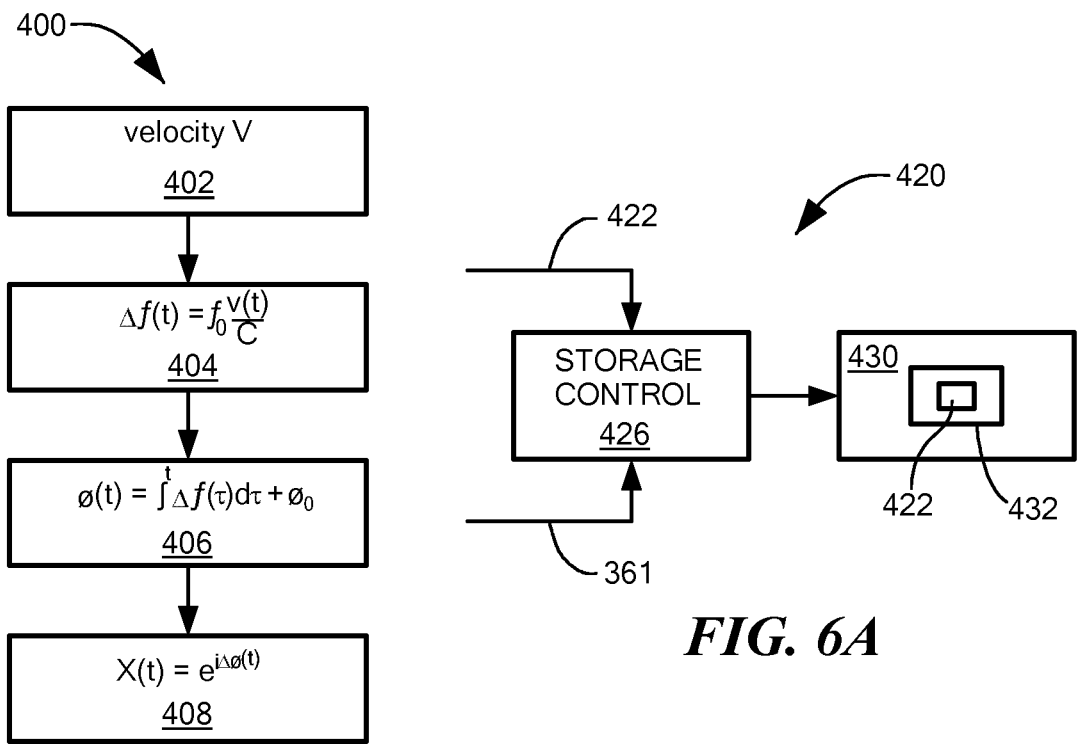
FIG. 5
FIG. 6A
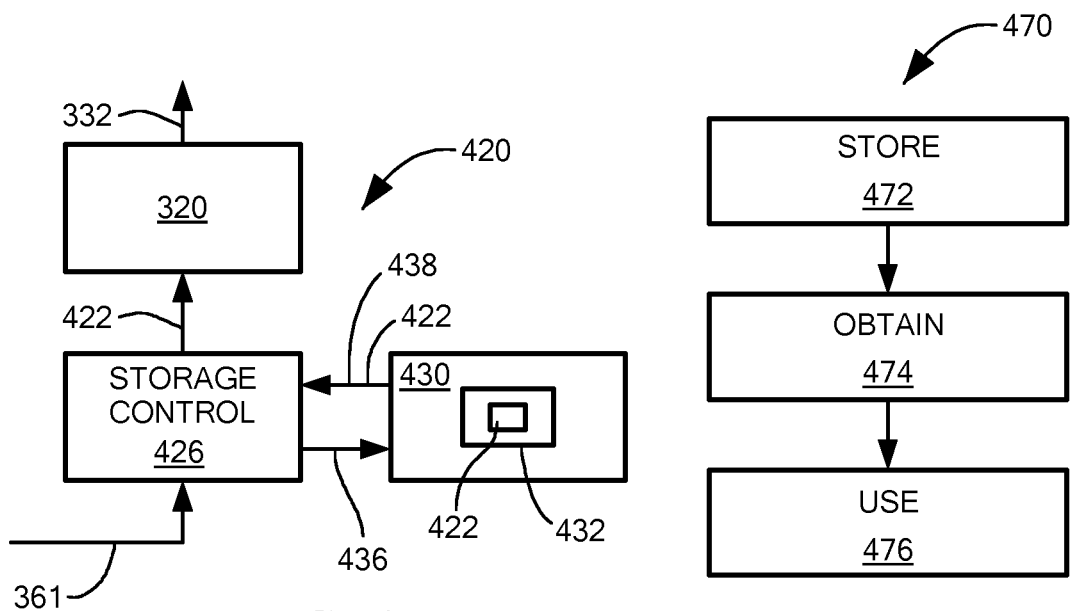
FIG. 6B
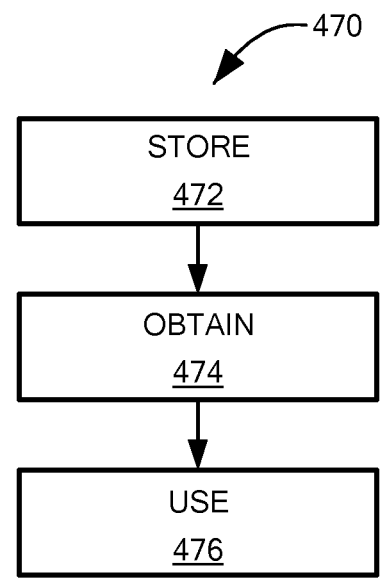
FIG. 6C

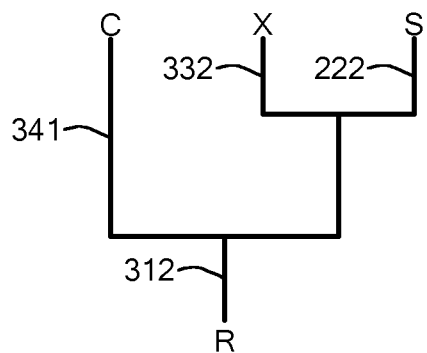
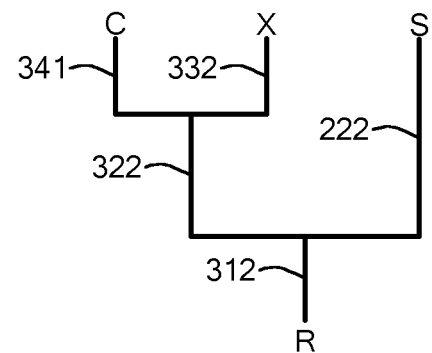
FIG. 19  FIG. 19A
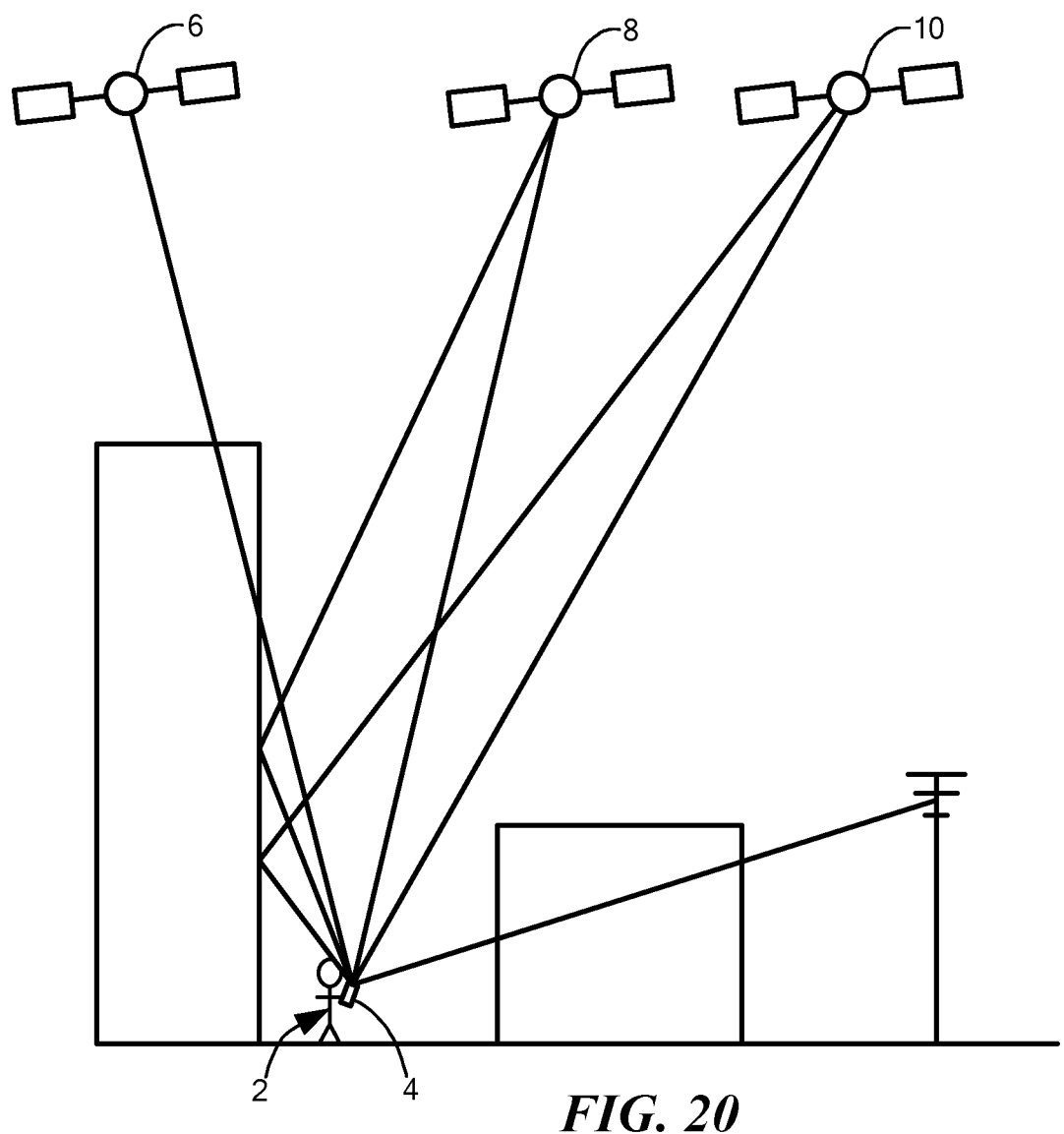
FIG. 20

METHOD AND SYSTEM FOR CORRECTING THE FREQUENCY OR PHASE OF A LOCAL SIGNAL GENERATED USING A LOCAL OSCILLATOR

This application claims priority from United Kingdom Patent Application GB 1710894.5, filed Jul. 6, 2017, which is incorporated herein by reference in its entirety.

TECHNICAL FIELD

The present invention relates to a positioning system and a method performed in a positioning system for improving the frequency stability of a local signal generated using a local oscillator.

BACKGROUND ART

A local oscillator is an important component in a positioning system, such as a GNSS receiver. Local oscillators are often low cost components, including, for example, quartz crystals. These local oscillators are relatively unstable in comparison to high cost local oscillators such as atomic clocks. However, for many positioning applications this is not especially important since absolute time is calibrated in GNSS positioning calculations, and even low cost local oscillators can achieve stability over time periods that are longer than the time period over which signals are coherently integrated.

Some positioning applications require higher stability in the local oscillator. This is particularly important in applications that require the detection of weak signals, such as those that can be found in indoor environments. These weak signals require a long integration period if they are to be detected with sufficient strength to be used in positioning calculations. It is critical to achieve local oscillator stability over the integration period in order for these calculations to be effective.

One way of achieving high local oscillator stability is to replace a low cost quartz crystal with a higher cost local oscillator such as an atomic clock. This is possible for high cost positioning devices, but it is impractical for consumer products such as mobile phones.

Another method of achieving high local oscillator stability is to identify and correct local oscillator errors by detecting a reference signal that has a stable frequency. For example, a reference signal could be received from a GNSS satellite that uses an atomic clock as a local oscillator. After the removal of effects due to the satellite Doppler shift and satellite frequency reference variations, the received signal can act as a reference against which the local oscillator can be corrected. Effectively, this can allow the local oscillator of the positioning system to be locked to (or indexed based on) the local oscillator of the satellite. This method is effective for static receivers such as those that are used in surveying applications. However, it is not effective when applied to consumer products such as mobile phones that are free to move around, since this local movement can be the source of other errors.

SUMMARY

An object of the present invention is to overcome and mitigate some of these problems.

According to an aspect of the present invention there is provided a positioning system, comprising: a local oscillator for providing a local frequency or phase reference; a receiver configured to receive a first reference signal from a first reference source in a first reference direction, the first reference signal having a received frequency and a received phase, wherein the first reference source provides the first reference signal at a known or predictable frequency or phase; a motion module configured to provide a measured or assumed movement of the receiver in the first reference direction; a reference source motion determination module configured to provide a movement of the first reference source in the first reference direction; a local oscillator offset determination module configured to calculate an offset to the received frequency or the received phase based on the measured or assumed movement of the receiver in the first reference direction and the movement of the first reference source in the first reference direction; and a local signal generator configured to use the local frequency or phase reference from the local oscillator, and the offset calculated by the local oscillator offset determination module, to provide at least a first local signal.

In this way, the positioning system can remove errors introduced to the first local signal by instabilities in the local oscillator. Errors in the local oscillator can be isolated by removing the effects introduced to the received phase or the received frequency based on the relative movement of the receiver and the first reference source in the first reference direction. The local oscillator of the positioning system can therefore be locked to the local oscillator of the first reference source. This can be achieved even with a moving receiver because the motion module can eliminate effects caused by this local movement. By improving the accuracy of the local signal generated using the local oscillator a moving receiver can provide longer coherent integration of signals than would otherwise be possible. This means that, following correction to the frequency or phase of the local oscillator, the sensitivity of the receiver is significantly improved so that weaker positioning signals can be detected and used in positioning calculations.

In theory the present arrangement could be used to correct the frequency or phase of the local oscillator based on the known or predictable frequency or phase of the first reference source and the correction to the received frequency or the received phase. However, in practice it is usually sufficient to calculate an offset to the received frequency or the received phase, and to apply this offset when generating the first local signal.

Preferably the receiver is configured to receive a first positioning signal from a first positioning source in a first positioning direction. A correlation unit can provide a first correlation signal by correlating the first local signal with the first positioning signal. The receiver can receive a plurality of positioning signals from respective positioning sources. By establishing ranges to these positioning sources the positioning system can calculate a position for the receiver. In addition, or as an alternative to position, the positioning system can provide outputs such as velocity, rotation or time coordinates.

The receiver may also receive a second reference signal from a second reference source in a second reference direction. An offset to the received frequency or the received phase of the second reference signal may be calculated based on the measured or assumed movement of the receiver in the second reference direction and the movement of the second reference source in the second reference direction. Thus, a plurality of reference sources may be used to calculate respective offset values for the frequency or phase of the local oscillator. The results achieved using the plurality of reference sources can be combined by averaging or any other mathematical technique as would occur to a person skilled in the art.

This approach can dramatically improve the stability of the frequency reference provided by the local oscillator in a positioning system. By calculating or estimating an offset (or a time series of offsets) to the local oscillator over the time period corresponding to the period of coherent integration of the received signal, it may be possible to provide coherent integration of received signals over periods of more than one second.

The receiver is free to move in its environment and still provide an offset to the local oscillator frequency. Preferably the measured or assumed movement of the receiver is variable in at least the first reference direction. The receiver may be stationary in the first reference direction for periods. However, this is not at all necessary for effective operation of the invention. The receiver is preferably free to move such that it is not fixed in position in its environment.

The local oscillator offset determination module is preferably configured to calculate a plurality or sequence of offsets to the received frequency or the received phase, as a function of time. Thus, the local oscillator offset determination module can calculate a vector that may include thousands of offset values that can represent changes in the behaviour of the local oscillator over time. This can allow the removal of errors that are due to a local oscillator with a varying frequency offset that changes in an unpredictable manner over the period of time required for coherent integration of a positioning signal.

Preferably the positioning system includes an inertial sensor configured to provide a measured movement of the positioning device in the first direction.

Advantageously the positioning system further comprises a motion compensation unit configured to provide motion compensation of at least one of the first local signal, the first positioning signal, and the first correlation signal based on the measured or assumed movement of the receiver in the first positioning direction.

In this way motion compensation can be applied to the first positioning signal, the local signal, or a combination thereof before the signals are correlated. Motion compensation may also be applied to the correlation signal, following correlation. By providing motion compensation in the first positioning direction, which extends between the receiver and the first positioning source, it is possible to achieve preferential gain for signals received along this direction. Thus, a line-of-sight signal between the receiver and the first positioning source will receive gain preferentially over a reflected signal that is received in a different direction. In a GNSS receiver this can lead to a remarkable increase in positioning accuracy because non-line-of-sight signals (e.g. reflected signals) are significantly suppressed. The strongest correlation may be achieved for the line-of-sight signal, even if the absolute power of this signal is less than that of a non-line-of-sight signal.

The first reference source may be a terrestrial transmitter. For example, the first remote source may be a cellular transmitter or DAB, DVB-T or analogue broadcasts. Importantly, the first reference source should have a stable and predictable frequency or phase. The local oscillator in the first reference source should, at least, be more stable than the local oscillator in the positioning system.

The first reference source may be a first satellite. The satellite may be a GNSS satellite, which has an atomic local oscillator with high stability.

The positioning system may comprise a reference source selection module configured to select the first reference source based on a determination that a direct line of sight is likely to be provided between the receiver and the first reference source. A plurality of reference sources may be available, and a number of these reference sources may be capable of operating as the first reference source. By selecting a reference source that has an unobstructed line of sight path to the receiver the received first reference signal is not adversely affected by reflections or other effects that could introduce an error to the frequency or phase, which may not be quantifiable.

The reference source selection module may be configured to select the first reference satellite based on a comparison of its elevation angle with a threshold. Preferably satellites are selected only if they have high elevation angles from the perspective of the receiver. In certain circumstances, satellites with particular elevation angles are more likely to have a direct line of sight with the receiver. This is especially important in challenging positioning environments such as urban canyons. In these environments, satellites with high elevation angles may be preferred as frequency references in comparison to terrestrial transmitters, the signals from which are more likely to be reflected before being received by a ground-level receiver. Satellite selection may also be performed based on a stored database including terrain profiles and building data, which may include information regarding building location, dimensions and construction materials, including locations of windows. This can allow the reference source selection module to select the first reference satellite if the first reference signal can be received along an unobstructed line of sight. For example, the reference source selection module may select a satellite with a low elevation angle if the building data in the stored database indicates that the relevant satellite can be viewed through a window along an unobstructed path that is not affected by any neighbouring buildings.

The motion module may be configured to identify a first time period based on measured movement of the receiver that corresponds to a time period of relative stability of the local oscillator. The motion module may be configured to identify a second time period based on measured movement of the receiver that corresponds to a time period of relative instability of the local oscillator. The correlation unit may be configured to provide the first correlation signal by correlating the first local signal with the first positioning signal, where the first local signal is provided during the first time period and the first positioning signal is received during the first time period. In this way, the correlated signals can be generated or received during time periods when the local oscillator is relatively stable. The correlation unit can therefore be inhibited during the second time period when the local oscillator is relatively unstable.

In one example the motion module may be configured to identify time periods corresponding to heel strikes in a receiver carried by a walking or running user. There may be high accelerations and high forces on the receiver during these time periods, which can cause temporary instabilities such that the local oscillator is less reliable. By identifying these time periods signal correlation can be performed for signals that are coherently integrated between heel strikes, and between periods of relative instability in the local oscillator. Of course, this can be applied during other periods in which the local oscillator is subject to shock. Thus, the second time period may correspond to measured movements of the receiver having an acceleration that is above a threshold value.

The positioning system may include at least two receivers. For example, the positioning system may be provided in a vehicle having a pair of antennas that are connected to separate receivers using the same local oscillator. One or both of the receivers may be used to receive the first reference signal from the first reference source in order to provide the correction to the frequency or phase of the local oscillator. In this arrangement it is possible that the correction could be applied to the local oscillator based on positioning signals received by one receiver. The corrected local oscillator signal could then be used for the correlation of a positioning signal received by the other receiver with a local signal. Such an arrangement is possible because the receivers share a single local oscillator.

According to another aspect of the present invention there is provided a method, performed in a positioning system, comprising the steps of: providing a local frequency or phase reference using a local oscillator; receiving a first reference signal from a first reference source in a first reference direction, the first reference signal having a received frequency and a received phase, wherein the first reference source provides the first reference signal at a known or predictable frequency or phase; providing a measured or assumed movement of the receiver in the first reference direction; providing a movement of the first reference source in the first reference direction; calculating an offset to the received frequency or the received phase based on the measured or assumed movement of the receiver in the first reference direction and the movement of the first reference source in the first reference direction; and using the local frequency or phase reference from the local oscillator, and the offset calculated by the local oscillator offset determination module, to provide at least a first local signal.

According to yet another aspect of the invention there is provided a computer readable medium comprising executable instructions that when executed by a computer cause the computer to undertake steps that include: providing a local frequency or phase reference using a local oscillator; receiving a first reference signal from a first reference source in a first reference direction, the first reference signal having a received frequency and a received phase, wherein the first reference source provides the first reference signal at a known or predictable frequency or phase; providing a measured or assumed movement of the receiver in the first reference direction; providing a movement of the first reference source in the first reference direction; calculating an offset to the received frequency or the received phase based on the measured or assumed movement of the receiver in the first reference direction and the movement of the first reference source in the first reference direction; and using the local frequency or phase reference from the local oscillator, and the offset calculated by the local oscillator offset determination module, to provide at least a first local signal.

The computer readable medium may be provided at a download server. Thus, the executable instructions may be acquired by the positioning system by way of a software upgrade.

A received positioning signal may include any known or unknown pattern of transmitted information, either digital or analogue, that can be found within a broadcast positioning signal by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions.

Conventionally phase changes in the received positioning signal caused by changes in the line-of-sight path between the receiver and the remote source were viewed as a nuisance that reduced positioning accuracy. The counter-intuitive approach of motion compensation can actually take advantage of these phase changes to improve identification of the line-of-sight signal from a positioning source.

The motion compensation unit can provide motion compensation to the local signal so that it more closely matches the received positioning signal. In another arrangement inverse motion compensation may be applied to the received positioning signal to reduce the effect on the received signal of the motion of the receiver. Similar results may be achieved by providing partial motion compensation to both the local signal and the received positioning signal. These techniques allow relative motion compensation to be applied between the local signal and the received positioning signal. In some embodiments motion compensation may be performed in parallel with correlation. Motion compensation can also be applied to the correlation signal directly.

In practice the received positioning signal may be processed as a complex signal, including in-phase and quadrature components. The local signal may be similarly complex. The correlation unit may be arranged to provide a correlation signal which may also be complex and which can be used as a measure of the correlation between these complex signals.

It may be possible to achieve high positioning accuracy by providing motion compensation of at least one of the local signal and the received positioning signal based on the measured or assumed movement in the first positioning direction. In practice, when applied to GNSS signals, the local and received signals may be encoded with a code which repeats periodically. For the GPS L1 C/A codes for example the local and received signals can include 1023 pseudorandom number code chips. The local and received signals may be analogue waveforms which may be digitised to provide values at the radio sampling rate, which means there may be millions of values over a 1 ms time period. The correlation between the local signal digital values and the received signal digital values may be calculated, having first corrected either set of values using a motion compensation vector for the relevant time period. These data points may then be summed over the time period. In practice this can produce an accurate result because it works at the radio sampling frequency, although it may be computationally intensive.

A lower positioning accuracy may be achieved by providing motion compensation of the correlation signal. In the above example, when applied to the GPS L1 C/A codes, the correlation may be performed independently on each of the ~1000 pseudorandom number code chips to produce ~1000 complex correlator signal outputs. The motion compensation vector can then be applied to these ~1000 correlation signal components. Finally, the motion compensated correlation signal can be summed to produce a measure of the correlation. Thus, motion compensation of the correlation signal may produce an approximation of the result that can be achieved by motion compensation of the local signal and the received signal. However, for some applications the loss in accuracy may be negligible, and may be accepted because it enables a reduction in computational load.

The receiver may comprise an antenna and electronics for processing the received signal. Preferably the motion module is configured to provide a measured or assumed movement of the antenna.

The positioning system may be provided on a single positioning device. Various calculation modules in the positioning system could be provided separately so that the positioning system is distributed. For example, certain calculations, such as the calculations performed by the motion compensation unit and/or the correlation unit may be undertaken by processors in a network. Thus, an electronic user device may offload calculations to other processors in a network where appropriate in the interest of efficiency.

In a preferred arrangement the system includes a GNSS positioning device. Positioning using GNSS positioning devices produces a number of difficulties indoors, where signals are weak, and in urban canyons, where there can be multipath signals. By allowing for phase change in the received positioning signal by virtue of the receiver's motion in the direction of the remote source, the correlation can be improved. It may also be possible to increase the coherent correlation period, in effect providing preferential gain for line-of-sight signals. The GNSS positioning device may be provided in an electronic user device such as a smartphone.

Preferably the device includes a processor configured to determine the first positioning direction to the known or estimated position of the positioning source and a measured or assumed position of the receiver. In some arrangements the measured or assumed position of the receiver may be fairly crude. For example, the city or region of the receiver may be known based on terrestrial radio signals or the last-known-position. The reference or positioning source may be a GNSS satellite with a known position based on broadcast ephemeris. A significant improvement in positioning accuracy of the receiver can then be achieved by providing preferential gain for the line-of-sight signal. If the received signal contains modulated data, such as the GNSS bits, then preferably these are predicted or provided, aligned, and removed for example by using standard assistance techniques available to cellular network providers. The inertial sensor may comprise at least one accelerometer. In addition, the motion module may comprise a barometric sensor for indicating the receiver's height above sea level, a geomagnetic sensor for indicating a receiver's bearing, and other motion sensors as would be understood by a person skilled in the art.

The motion compensation unit may be configured to provide motion compensation of at least one of the local signal, the received positioning signal and the correlation signal, based on a plurality of vectors that are derived from the measured or assumed movement in the first direction. In this context the vectors are like a matrix column, representing a number of values. The plurality of vectors may be a sequence of phase vectors, or phasors which are 2D phase vectors indicative of amplitude and phase changes introduced into the received signal by the measured or assumed movement of the receiver. Phasors generally comprise at least amplitude and an angle that describe the measured or assumed movement of the receiver in the first direction. The plurality of vectors may be combined with the at least one of the local signal, the received signal and the correlation signal in the motion compensation device to provide relative motion compensation between the local and received signals.

The plurality of vectors may be indicative of the measured or assumed movement in the first positioning direction as a function of time. Thus, the plurality of vectors may reflect a detailed movement of the receiver in time. For example, the plurality of vectors may reflect movement of the receiver while it rests in a user's pocket while jogging, walking, running or undergoing some other repetitive motion. In this example the receiver may execute a cyclical motion with peaks in acceleration corresponding to each heel strike.

The device may include a memory configured to store a parameter or set of parameters related to the motion compensation provided for the at least one of the local signal, the received positioning signal and the correlation signal at a first time. At a second time, the motion compensation unit may be configured to provide motion compensation of at least one of the local signal, the received positioning signal and the correlation signal, based on the stored parameter or set of parameters. The stored parameter or set of parameter may be the motion compensated signal. Alternatively, the stored parameter or set of parameters may be a plurality of vectors that can be combined with the at least one of the local signal and the received positioning signal to produce the motion compensated signal.

Advantageously, the parameter or set of parameters can be stored based on the motion of the receiver at the first time. The parameter or set of parameters can then be re-used at the second time, if appropriate. In one example, the re-use of the parameter or set of parameters may be appropriate if the motion of the receiver at the second time is similar to the motion of the receiver at the first time.

Re-using the stored parameter or set of parameters can advantageously reduce computational load in comparison to a system where motion compensation is re-calculated at every epoch. This can also decrease power consumption in the system, thereby improving battery life when the system is implemented on an electronic user device.

At the second time, the motion compensation unit may be configured to compare the measured or assumed movement of the receiver at the first time with a measured or assumed movement of the receiver at the second time and, based on the comparison, provide motion compensation of at least one of the local signal, the received positioning signal and the correlation signal, based on the stored parameter or set of parameters. The movement of the receiver is often highly similar in different time periods. In a car, speed and bearing may be similar over time periods separated by a few seconds, especially in motorway conditions. Similarly, when the receiver is held by a jogger it will typically have a predictable pattern of movement; if the speed and bearing of the user does not change, the pattern may be repeated in time periods separated by a few seconds or more. In these situations the comparison may indicate a substantial similarity between movement at the first time and movement at the second time. Thus, it may be efficient for the receiver to re-use parameters such as vectors or phasors that were calculated for the earlier epoch. These parameters may be used to provide effective motion compensation at the second time, while reducing computational load and preserving battery resources.

Features of the positioning system may be provided as method features and vice-versa.

BRIEF DESCRIPTION OF THE DRAWINGS

Embodiments of the invention are now described, by way of example, with reference to the drawings, in which:

FIG. 5 schematically illustrates an example of a method performed by a motion-compensated phasor generator;

FIGS. 6A and 6B illustrate an example of a motion-compensated correlation sequence storage system during a write operation (FIG. 6A) and during a read operation (FIG. 6B) and FIG. 6C illustrates a method performed by the motion-compensated correlation sequence storage system;

FIGS. 19A and 19 illustrate different techniques by which signals can be combined in an embodiment of the invention;

FIG. 20 is a schematic view of a user holding a positioning device in a challenging positioning environment;

DETAILED DESCRIPTION

Figure 1:
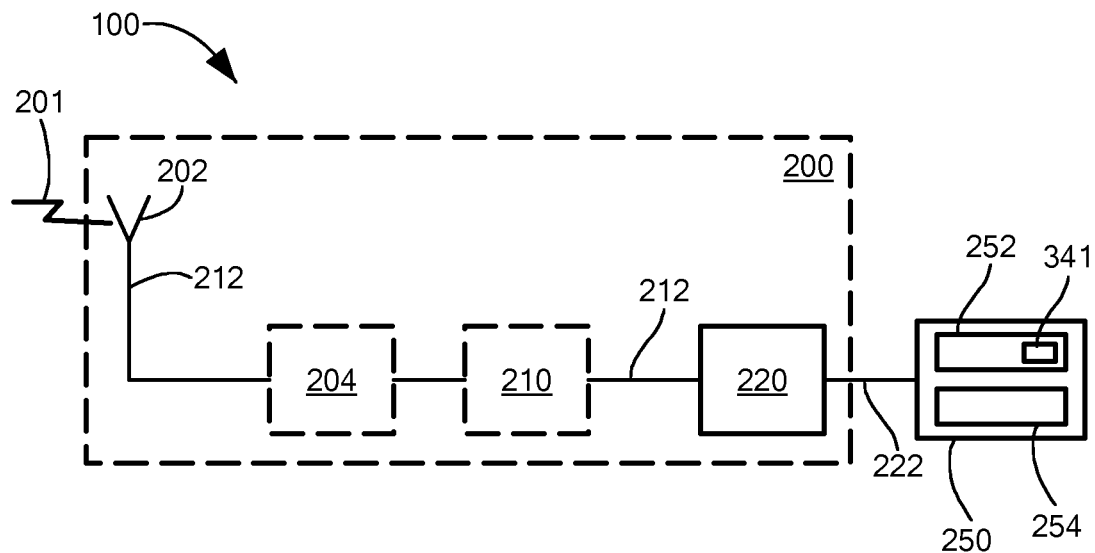
FIG. 1 illustrates an example of a system for correlating a digital signal and a correlation code.

FIG. 20 is a schematic view of a user 2 holding a positioning device 4 in an urban environment (to represent a challenging positioning environment). In this example the positioning device 4 can receive signals from first, second and third positioning satellites 6, 8, 10. The positioning device 4 can also receive signals from a terrestrial transmitter 12. The signal from the satellite 6 and the terrestrial transmitter 12 are received through buildings. These signals are attenuated by the material of the buildings, which means that the signal strengths can be low, especially for the signals received from the distant satellite 6. In some instances the signal strengths may be too low for use in positioning calculations, unless the signals are integrated over a relatively long period of time (perhaps as much as 1 second, or longer). Received signals may also be subject to multipath, which represents an additional complication. In FIG. 20 the signals from satellites 8, 10 can be received directly, along the line of sight, or reflected from a neighbouring building.

Figure 21:
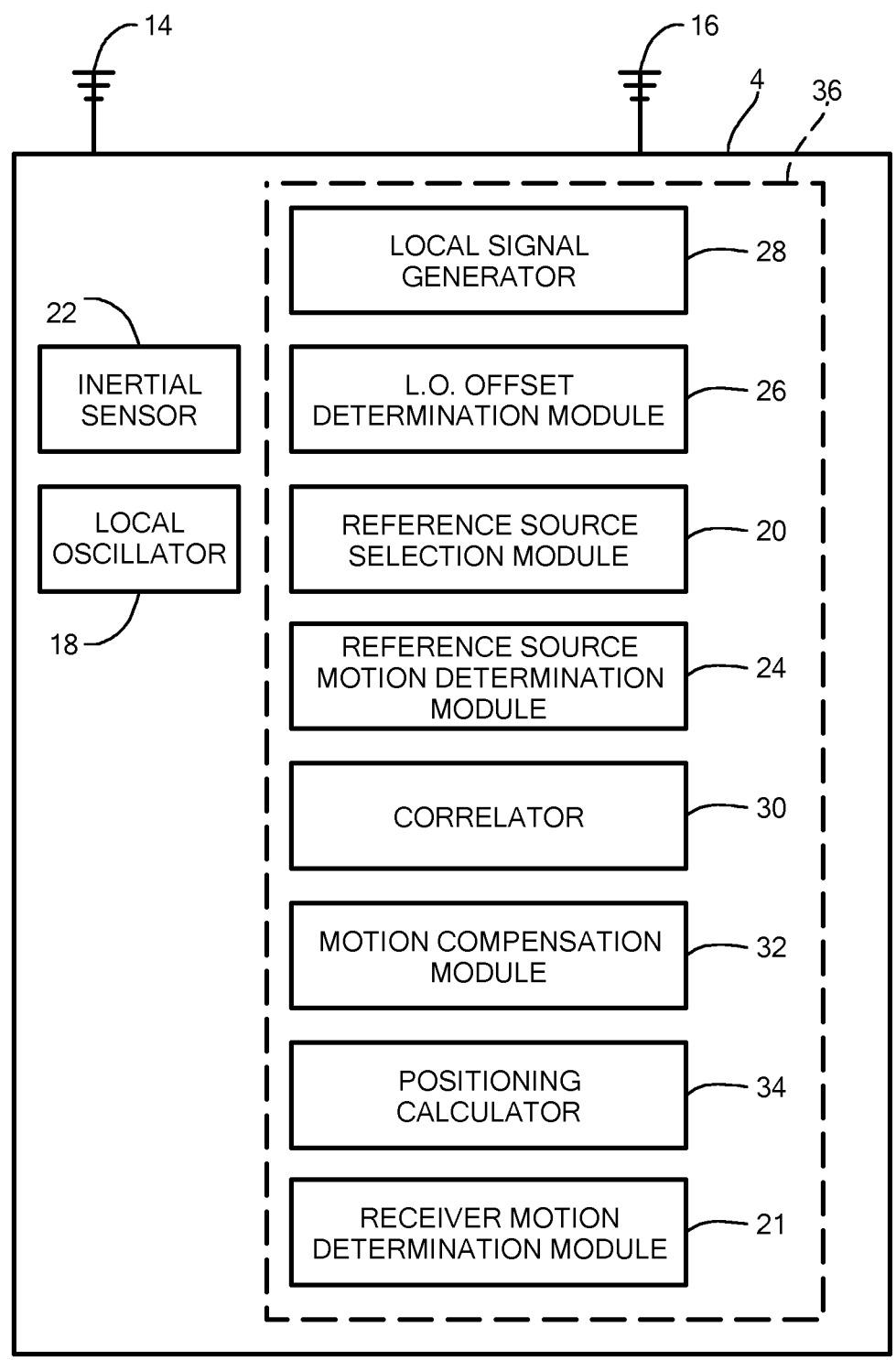
FIG. 21 is a schematic view of a positioning device in an embodiment of the invention.

FIG. 21 is a schematic view of the positioning device 4 in an embodiment of the invention. In this example the positioning device 4 comprises a pair of antennas 14, 16. A single local oscillator 18 is provided which is generally simple and low cost. For example, the local oscillator 18 may comprise a quartz crystal. The positioning device 4 also includes an inertial sensor 22, which may include a plurality of separate motion sensors. Various modules are provided separately or together in a processor 36. These modules may be provided in a single device or they may be provided in a distributed fashion across a network. The processor 36 includes a local signal generator 28, a local oscillator offset determination module 26, a reference source selection module 20, a reference source motion determination module 24, a correlator 30, a motion compensation module 32, a receiver motion determination module 21 and a positioning calculator 34.

Figure 22:
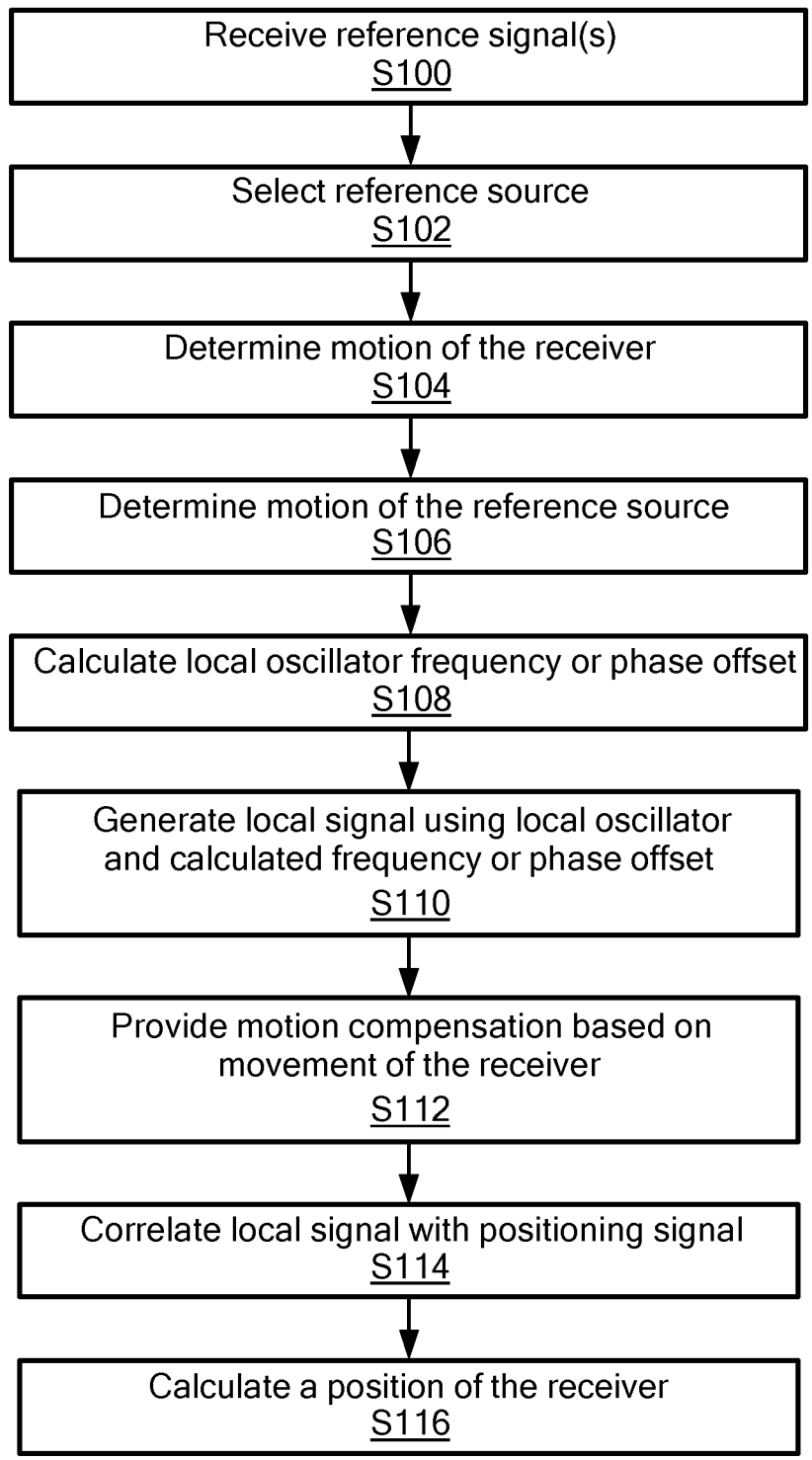
FIG. 22 is a flow diagram illustrating a series of steps that can be undertaken in an embodiment of the invention.

FIG. 22 is a flow diagram showing steps that can be undertaken in a positioning system in an embodiment of the invention. In use, at step S100, one of the antennas 14, 16 receives a signal from one or more potential reference sources. The potential reference sources may be satellites 6, 8, 10 or terrestrial transmitters 12. Importantly, the potential reference sources each have a highly stable local oscillator, which is at least more stable than the local oscillator 18 in the positioning device 4.

At step S102 a reference source is selected, based on the received signals, using the reference source selection module 20. In particular, the reference source selection module 20 selects a reference signal which is likely to satisfy a number of criteria relating to signal quality. A reference signal is selected if it has a signal strength above a minimum signal strength, is likely to be received along a direct line of sight (without reflections), and the relative motion between the reference source and the receiver is well known or estimated. These criteria may be satisfied by a terrestrial transmitter 12 or a satellite 6, 8, 10. Where the reference source is a satellite, these criteria are more likely to be satisfied in particular scenarios with particular elevation angles. In FIG. 20 the satellites 8, 10 are likely to be the best candidates for a reference source since they have high elevation angles, and signals can be received from them along unobstructed paths. These overhead satellites have motions with small components along the line of sight vector to the antenna 14. Additionally, these satellites are more likely to present a direct line of sight and high signal strength to the antenna 14. In one arrangement, the reference source selection module 20 only selects a satellite as a reference source if its elevation angle is above a threshold, which may be around 80 degrees.

The reference source selection module 20 may make use of information regarding position when selecting a reference signal. In one example, data may be determined that indicate that the user is positioned in an extreme urban environment, amidst very high buildings. This may be determined from, for example, cell tower positioning. In such a scenario the reference source selection module may provide a high threshold for the elevation angle of satellites, only selecting satellites if they have an elevation angle that is greater than around 80 degrees. In a different scenario data may indicate that the user is positioned in a suburban environment. The reference source selection module 20 may use this information to apply a lower threshold by selecting satellites that have an elevation angle that is greater than around 60 degrees.

In another arrangement, at step S102, the reference source selection module 20 can select a reference source while making use of three-dimensional map data. The three-dimensional map data may include information regarding mountains and other geographic features, as well as information regarding the shape and dimensions of buildings. The reference source selection module 20 can select a reference source that can provide a reference signal along an unobstructed path that does not intersect with any buildings or other features.

At step S104 the inertial sensor 22 provides a measured movement of the receiver 4. At step S104, the motion of the receiver is determined in receiver motion determination module 21 using measurements made by the inertial sensor 22, which may include measurements from a plurality of motion determination sensors. The inertial sensor 22 is fixed relative to the antenna 14. Therefore, the measured movement of the inertial sensor 22 can be interpreted by the receiver motion determination module 21 as a measured movement of the antenna 14. The receiver motion determination module 21 can determine a component of the measured movement that is in the direction of the selected reference source.

At step S106 the reference source motion determination module 24 determines the motion of the reference source. In particular, the reference source motion determination module 24 can determine the component of the motion of the reference source (which may be fixed on the ground) that is in the direction of the line of sight between the antenna 14, 16 and the selected reference source.

The receiver motion determination module 21 and the remote source motion determination unit 24 can provide inputs to the local oscillator offset determination module 26. In this way, the local oscillator offset determination module 26 can determine the relative movement of the receiver 4 and the selected reference source, along the vector that connects them. This can be determined initially based on a rough awareness of the location of the receiver 4 and the location of the reference source. The relative movement of the receiver 4 and the selected reference source can be improved once the location of the receiver and/or the selected reference source is known more accurately.

At step S108 the local oscillator offset determination module 26 can calculate the frequency or phase error that is introduced to the received reference signal 6,8,10,12 due to the relative movement of the reference source and the receiver 4. The received reference signal is provided by the reference source at a known and stable frequency or phase. Therefore, once the Doppler error is removed, any remaining difference between the known frequency or phase of the reference source and the frequency or phase that is actually received can be attributed to an error in the frequency or phase reference provided by the local oscillator 18. On this basis, the local oscillator offset determination module 26 is configured to calculate an offset to the frequency or phase reference provided by the local oscillator 18.

At step S110 the local signal generator 28 generates a local signal using the frequency or phase reference provided by the local oscillator 18 together with the offset calculated by the local oscillator offset determination module 26. In this way, the accuracy of the local oscillator 18 can be matched to the accuracy of the local oscillator of the reference source. Thus, the local signal can be provided with a greater stability. This improves the ability of the receiver 4 to integrate positioning signals coherently from satellites or other sources because these signals can be correlated against a local signal with a higher stability.

At step S112 the motion compensation module 32 is configured to provide motion compensation of at least one of the local signal and the received positioning signal. This is achieved by using the receiver motion determination module 21 to provide the movement of the antenna 14, 16 in the direction of the positioning source. If the positioning source is a GNSS satellite then the receiver motion determination module 21 provides the movement of the antenna 14 along the line of sight direction between the antenna and the satellite. In this way motion compensation can be applied to the received positioning signal, the local signal, or a combination thereof before the signals are correlated. Motion compensation may also be applied to the correlation signal, following correlation. By providing motion compensation in the direction which extends between the receiver and the positioning source it is possible to achieve preferential gain for signals received along this direction. Thus, a line-of-sight signal between the receiver and the positioning source will receive gain preferentially over a reflected signal that is received in a different direction. In a GNSS receiver this can lead to a remarkable increase in positioning accuracy and a better estimate of the signal phase because non-line-of-sight signals (e.g. reflected signals) are significantly suppressed. The highest correlation may be achieved for the line-of-sight signal, even if the absolute power of this signal is less than that of a non-line-of-sight signal.

At step S114 the correlator 30 is configured to correlate the local signal with a positioning signal received from a GNSS satellite 6, 8, 10 or other positioning source. A received positioning signal may include any known or unknown pattern of transmitted information, either digital or analogue. The presence of such a pattern can be determined by a cross-correlation process using a local copy of the same pattern (the local signal). The received positioning signal may be encoded with a chipping code that can be used for ranging. Examples of such received signals include GPS signals, which include Gold Codes encoded within the radio transmission. Another example is the Extended Training Sequences used in GSM cellular transmissions.

At step S116 the positioning calculator 34 is configured to output a position for the receiver 4, based on the previous calculations. This can be achieved in the known way by establishing ranges to at least three positioning sources and using a mathematical filter to determine position. The position output by the receiver 4 can be used in a wide variety of applications, as is known in the art.

Advantageously the present techniques can allow the receiver 4 to integrate the received positioning signal over a long period of time, even though the receiver 4 is free to move within its environment. This is achieved by improving the stability of the local signal produced using the local oscillator 18 together with the offset calculated by the local oscillator offset determination module 26. This can allow a received positioning signal to be integrated coherently over a period of 1 second or longer without introducing errors due to any inherent instability in the local oscillator 18.

In one embodiment the inertial sensor 22 is arranged to measure an acceleration of the antenna 14. If the acceleration of the antenna is determined to be above a threshold value then outputs from the receiver 4 can be inhibited. This is provided because it has been determined that the local oscillator 18 is especially unstable during periods of high acceleration such as may be experienced due to jolting movement. For a running or walking user these high accelerations may be experienced during heel strikes. Outputs from the receiver 4 can be provided for signals received between heel strikes, and outputs can be effectively inhibited for signals received during heel strikes. Effectively, this means that positioning signals are preferentially coherently integrated between heel strikes. This can improve the ability of the device to detect weak signals in an indoor environment. In another arrangement an additional local oscillator offset may be calculated based on the forces acting on the local oscillator 18, rather than rejecting data from such periods. In some arrangements these forces may cause a predictable frequency offset, which can be applied at the local signal generator 28.

The receiver 4 is provided with two antennas 14, 16 in this embodiment. One or both of the antennas 14, 16 may be used to receive the reference signal from the selected reference source. The offset calculated by the local offset calculator 26 could then be used to generate a local signal used for correlation against a positioning signal received from the other antenna 16. This is possible because the two antennas 14, 16 share a single local oscillator 18 which has a common offset.

In another arrangement, two separate receivers can be used. A first receiver can use a local oscillator signal provided by a second receiver, in place of its own local oscillator signal. Thus, the first receiver can rely on the local oscillator signals provided by the second receiver without needing to determine its own corrections. The first and second receivers may be co-mounted, or provided separately.

One form of noise that can arise in a communications channel arises from multi-path effects. A signal received at a receiver may have arrived at the receiver via multiple different paths each of which has different characteristics such as path length. The multi-path signals received are therefore generally received at different times and possibly with different attenuation characteristics and phase. Each multi-path signal may therefore act as noise in relation to each of the other multi-path signals. This can be a significant problem in circumstances where multi-path conditions are prevalent.

Even where multi-path conditions are not prevalent, noise can arise from other sources such as for example clock drift at a receiver, movement of the receiver causing Doppler shifts in frequency, and timing misalignment between a transmitter and the receiver, electromagnetic interference, and intentional jamming.

The signal may also be attenuated by the environment, for example obstructions in the propagation channel, degrading the signal to noise ratio of the received signal.

It would be desirable to improve correlation of a digital signal and a correlation code.

The inventors have realized that by performing a motion-compensated correlation it is possible to significantly improve the correlation of the received digital signal and a correlation code. By, for example, performing motion-compensated correlation along the direction of travel of a receiver, the correlation between received digital signals and the correlation code is significantly biased towards the correlation of a digital signal received along the direction of travel of the receiver and the correlation code. Therefore by compensating for movement of the receiver in a particular direction the gain of signals received from that particular direction is enhanced while the gain of signals received not from that direction (i.e. reflected signals arriving at the receiver from directions that are not toward the transmitter) is decreased. Therefore by performing motion-compensated correlation specifically along the line of sight vector from the receiver to the transmitter the signal to noise ratio of the received signals aligned with the direction of motion-compensation is increased, and the accuracy of the measurement of signal arrival time is improved. It is also possible, by performing the motion-compensated correlation to reduce or remove the effects of Doppler shift, including compensating for any motion of the transmitter.

The inventors have created a new type of motion-compensated correlation sequence (called a supercorrelator) that can be used to perform motion-compensated correlation. The motion-compensated correlation sequence may be stored and may be re-used.

A further advantage of using motion-compensated correlation is that longer correlation periods can be used to improve correlation gain. The use of longer correlation periods significantly improves the correlation gain and so makes the receiver significantly more sensitive.

A further advantage of motion-compensated correlation is the ability to perform long coherent integrations while the receiver is moving.

The following definitions will be used in this document:

A correlation code is a certain sequence of symbols that is known to have specific autocorrelation properties.

A correlation sequence is a sequence of symbols that is correlated with a digital signal during correlation. A symbol represents an integer number of one or more bits. The correlation sequence may be represented in the form of a sequence of real numbers, or a sequence of complex numbers.

Motion-compensated correlation is correlation that uses a motion-compensated correlation sequence.

A motion-compensated correlation sequence is a correlation sequence that has been phase-compensated in dependence upon movement (assumed or measured) of a receiver. —A motion-compensated correlation sequence is used in this document to refer to either a motion-compensated phasor sequence or a motion-compensated correlation code. In practice, the motion compensated correlation sequence is constructed using a motion-compensated phasor sequence.

A motion-compensated phasor sequence is a sequence of phasors that have been phase-compensated in dependence upon movement (assumed or measured) of a receiver.

A motion-compensated correlation code is a correlation code that has been compensated by a sequence of phasors that have been phase-compensated in dependence upon movement (assumed or measured) of a receiver. A motion-compensated correlation code may, for example, be formed by the combination of a correlation code and a motion-compensated phasor sequence.

The phase compensation may optionally also take into account any errors caused by instability of the local oscillator during the time period associated with the correlation sequence. The phase compensation may optionally also take into account the motion of the transmitters, for example in the case of satellite-based transmitters Motion compensation can be provided by direct measurements, modelling/predicting/estimating behaviour, or through indirect methods such as an optimisation process over a range of possible velocities.

Coherent integration is the summation of sequences of symbols in such a manner as to preserve the phase relationship of the input sequence throughout, such that sections of the sequence can be added together constructively in both amplitude and phase.

FIG. 1 illustrates an example of a system 100 for correlating a digital signal 222 and a correlation code 341. The system 100 comprises a receiver system (receiver) 200 and processing system 250.

The receiver 200 comprises an antenna or antennas 202 for receiving signals 201 to produce an analogue signal 212. In this example, but not necessarily all examples, the analogue signal 212 is amplified by a pre-amplifier 204, however this stage is optional. Next the analogue signal 212, in this example but not necessarily all examples, is down-converted by down-converter 210 to a lower frequency analogue signal. However, this stage is also optional. The analogue signal 212 is then converted from analogue form to digital form by analogue to digital converter 220 to produce a digital signal 222. This is the received digital signal. The received digital signal 222 is provided to processing system 250.

The processing system 250 comprises a correlation system 252 and also, in this example but not necessarily all examples, comprises a control system 254. The correlation system 252 correlates the received digital signal 222 with a correlation code 341. The control system 254, if present, may be used to control the correlation system 252.

Figure 2:
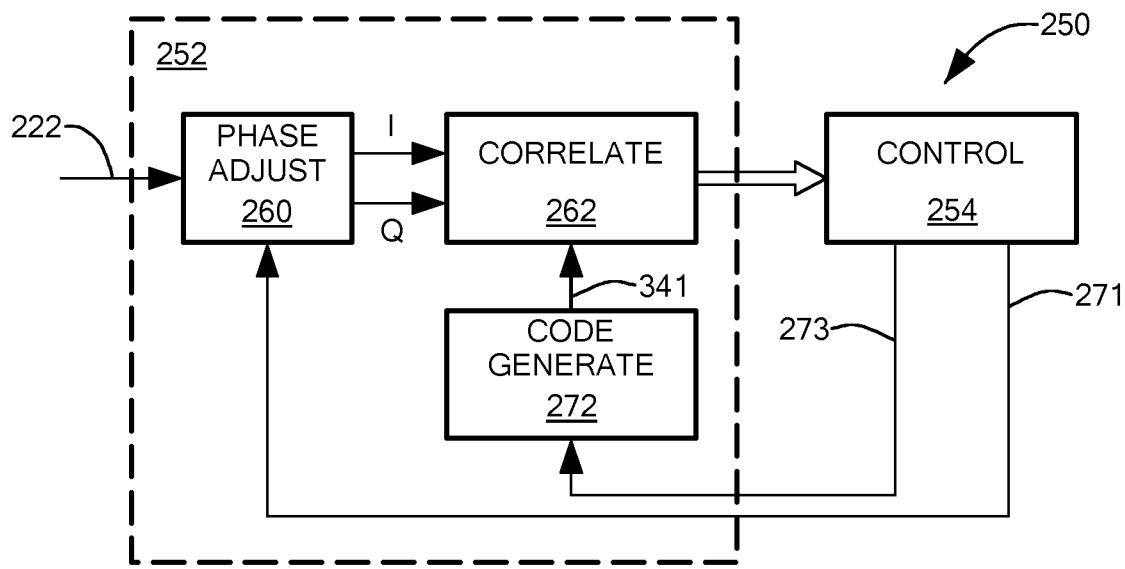
FIG. 2 illustrates an example of the system for correlating a digital signal and a correlation code that does not use motion-compensated correlation based on a motion-compensated correlation sequence.

FIG. 2 illustrates an example of the processing system 250 for correlating a digital signal 222 and a correlation code 341. This example does not use motion-compensated correlation based on a motion-compensated correlation sequence and is intended to demonstrate the difference between motion-compensated correlation using a motion-compensated correlation sequence and correlation that is not motion-compensated because it does not use a motion-compensated correlation sequence.

Initially a phase-adjustment module 260 adjusts the phase of the received digital signal 222. This phase adjustment produces an in-phase digital signal (I) and a quadrature phase digital signal (Q). These complex digital signals are provided to a correlation module 262 which correlates the phase-adjusted digital signals with a correlation code 341. The results of the correlation module 262 are output from the correlation system 252 to the control system 254. The control system 254 uses the results of the correlation to provide a closed loop phase adjustment signal 271 to the phase adjustment module 260 and to provide a closed loop code adjustment signal 273 to a code generation module 272 used to produce the correlation code 341.

Code-phase alignment may be achieved by adjusting the correlation code 341 using the closed loop code adjustment signal 273 which may, for example, form part of a delay locked loop. Carrier-phase alignment may be achieved by adjusting the phase of the received digital signal via the closed loop phase adjustment signal 271 which may be part of a phase locked loop.

While signal to noise levels are sufficiently high and a lock of the closed control loops is maintained, the closed control loops automatically compensate for Doppler shift arising from relative movement between the antenna 202 and a source of the received digital signals 222. However, "lock" may be absent during an acquisition phase, or lost due to temporary signal loss or due to low signal to noise levels, for example.

Figure 3:
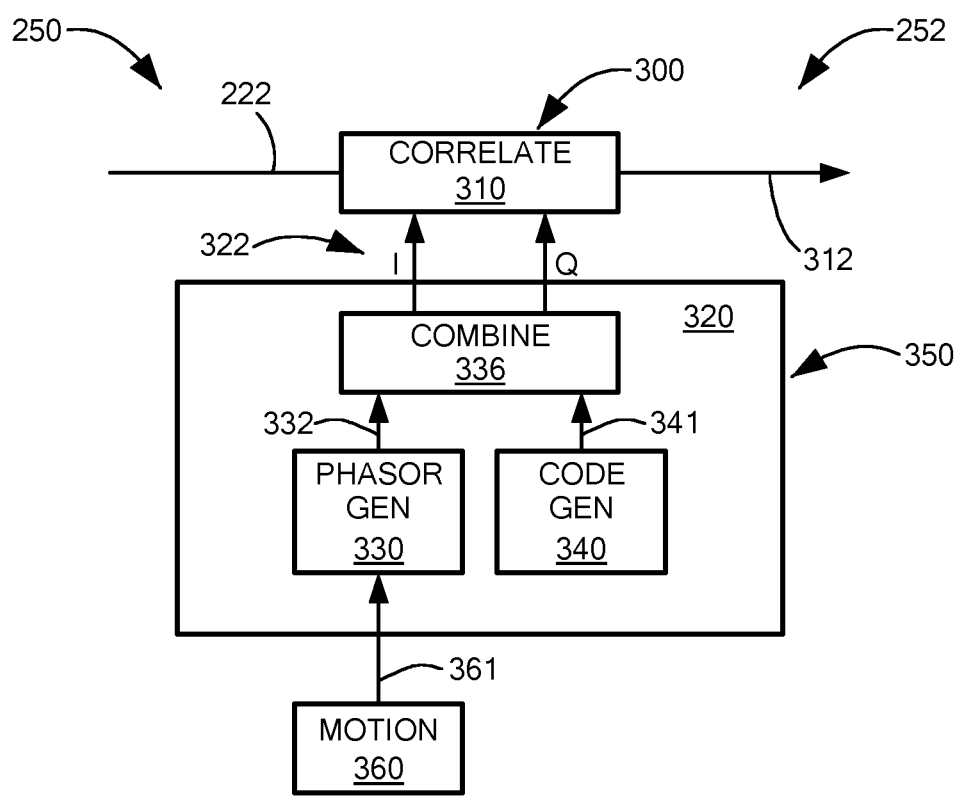
FIG. 3 illustrates an example of a correlation system suitable for use in a processing system of a system for motion-compensated correlation of a digital signal and a correlation code.

The inventors have developed a new processing system 250, illustrated in FIG. 3 that is suitable for use in a system as illustrated in FIG. 1.

The new processing system provides improved correlation of the received digital signal 222 and a correlation code 341 by using motion-compensated correlation based upon a motion-compensated correlation sequence.

It should be appreciated that the processing system 250 of FIG. 3, in contrast to the processing system 250 of FIG. 2, uses open loop control 350 to produce a motion-compensated correlation code 322 used in a correlator 310 to correlate with the received digital signal 222.

The processing system 250 illustrated in FIG. 3 may, for example, be a permanent replacement to the processing system 250 illustrated in FIG. 2 or may be used on a temporary basis as an alternative to the processing system 250 illustrated in FIG. 2.

The open loop control 350 of the processing system 250 in FIG. 3 is based upon an assumed or measured movement 361 of the receiver 200 and is not based upon feedback (closing the loop) from the results of any correlation.

The processing system 250 for motion-compensated correlation of a received digital signal 222 and a correlation code 341 may be used for a number of different applications. It may, for example, be used for time and/or frequency synchronization and/or channel estimation and/or channel separation.

The correlation code 341 used may be application-specific. For example, where the processing system 250 is part of a direct sequence spread spectrum communication system such as a CDMA mobile telecommunications receiver, the correlation code (chipping code) is a pseudo-random noise code. For example, if the receiver 200 is a receiver for a global navigation satellite system (GNSS) the correlation code is a pseudo-random noise code, for example, a Gold code. For example, if the receiver 200 is a receiver for a communication system, the correlation code may be a training or pilot symbol sequence such as those used in orthogonal frequency division multiplexing (OFDM), long term evolution (LTE) and digital video broadcasting (DVB) standards.

In some examples, the correlation code 341 may be dependent upon an identity of a transmitter of the digital signal 222 separating the communication channel into different code divided channels via code division multiple access.

In some circumstances the digital signal 222 is modulated with data, for example navigation bytes in a GNSS system. However, in other examples the digital signal 222 is not modulated with data such as, for example, when it is a training or pilot sequence.

FIG. 3 illustrates an example of a correlation system 252 suitable for use in a processing system 250 of a system 100 for motion-compensated correlation of a digital signal 222 and a correlation code 341. The motion-compensated correlation system 252 provides a motion-compensated correlator 300 comprising a correlator 310 and a motion-compensated correlation sequence generator 320.

A receiver-motion module 360 which may or may not form part of the motion-compensated correlator 300 provides a movement signal 361, indicative of movement of the receiver 200, to the motion-compensated correlation sequence generator 320.

The motion-compensated correlation sequence generator 320 comprises a motion-compensated phasor generator 330 which receives the movement signal 361 and produces a motion-compensated phasor sequence 332.

The motion-compensated correlation sequence generator 320 additionally comprises a correlation code generator 340 which produces a correlation code 341.

The motion-compensated correlation sequence generator 320 additionally comprises a combiner (mixer) 336 which combines the motion-compensated phasor sequence 332 and the correlation code 341 to produce a motion-compensated correlation code 322, as shown in FIG. 19A. An alternative technique for combining these signals is shown in FIG. 19.

The motion-compensated correlation code 322 is provided by the motion-compensated correlation sequence generator 320 to the correlator 310 which correlates the motion-compensated correlation code 322 with the received digital signal 222 to produce the correlation output 312.

The motion-compensated correlator 300 comprises an open loop 350 from the receiver-motion module 360 through the motion-compensated correlation sequence generator 320 to the correlator 310. There is no feedback resulting from the correlation output 312 to the motion-compensated correlation sequence generator 320 and it is therefore an open loop system.

It will therefore be appreciated that the correlator 310 performs the following method: correlating a digital signal 222 provided by a receiver 200 with a motion-compensated correlation code 322, wherein the motion-compensated correlation code 322 is a correlation code 341 that has been compensated before correlation using one or more phasors dependent upon an assumed or measured movement of the receiver 200. The correlation code 341 is compensated for movement of the receiver 200 before correlation by combining the correlation code 341 with the motion-compensated phasor sequence 332. The motion-compensated phasor sequence 332 is dependent upon an assumed or measured movement of the receiver 200 during the time that the receiver 200 was receiving the digital signal 222.

It will therefore be appreciated that the motion-compensated correlation sequence generator 320 causes correlation of a digital signal 222 provided by a receiver 200 with a motion-compensated correlation code 322, wherein the motion-compensated correlation code 322 is a correlation code 341 that has been compensated before correlation using one or more phasors dependent upon an assumed or measured movement of the receiver.

The use of an open loop 350 for controlling the motion-compensated correlation has advantages, for example, it is fast because the control is not based upon the result of a preceding correlation. The use of the open loop control to perform motion-compensated correlation enables the correlator 310 to operate in situations where there is a low signal to noise ratio.

Although in FIG. 3 receiver-motion module 360, the motion-compensated correlation sequence generator 320 and the correlator 310 are illustrated as part of the motion-compensated correlator 300, in other examples only the correlator 310 may be part of the correlation system with the motion-compensated correlation code 322 being provided to the motion-compensated correlator 300 by a motion-compensated correlation system generator 320 that is not part of motion-compensated correlator 300. In other examples, only the correlator 310 and the motion-compensated correlation sequence generator 320 may be part of the motion-compensated correlator 300 with the receiver-motion module 360 providing the movement signal 361 to the motion-compensated correlator 300.

Although in this example, the motion-compensated correlation sequence generator 320 is illustrated as a single entity comprising the motion-compensated phasor generator 330, the correlation code generator 340 and the combiner (mixer) 336, it should be understood that these may be components distinct from the motion-compensated correlation sequence generator 320 or combined as components other than those illustrated within the motion-compensated correlation sequence generator 320.

It will be appreciated by those skilled in the art that the motion-compensated correlator 300 illustrated in FIG. 3 is a significant and remarkable departure from what has been done before in that it adopts a counter-intuitive approach by modifying the correlation code 341 before correlation even though those correlation codes 341 may have been carefully designed for excellent cross-correlation results.

The motion-compensated correlator 300 illustrated in FIG. 3 may be permanently functional or may be temporarily functional. For example it may be functional during a satellite acquisition phase in a GNSS receiver, and/or when there is signal loss and/or when there are low signal to noise levels for example. The motion-compensated correlator 300 may preserve the phase coherence of the digital signal 222, thus allowing longer coherent integration times.

Figure 4:
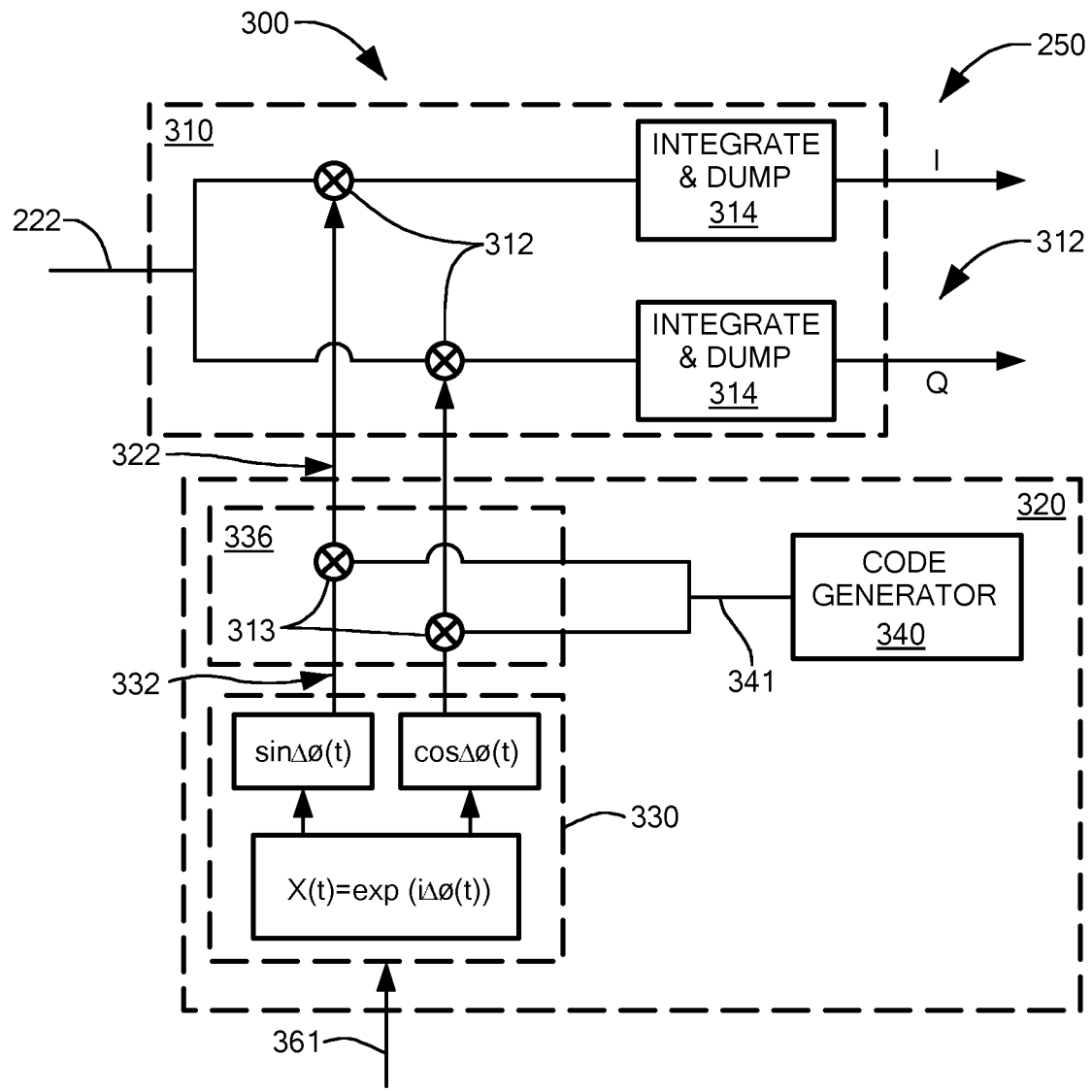
FIG. 4 illustrates an example of a motion-compensated correlator.

FIG. 4 illustrates an example of the motion-compensated correlator 300 illustrated in FIG. 3. This figure illustrates potential sub-components of the correlator 310, and the motion-compensated correlation sequence generator 320.

In this example the motion-compensated phasor generator 330 produces a motion-compensated phasor sequence 332 that comprises an in-phase component I and a quadrature phase component Q. Both of the in-phase component I and the quadrature phase component Q are mixed 313 with the same correlation code 341 produced by the code generator 340 to produce as the motion-compensated correlation code 322 an in-phase component I and a quadrature phase component Q. The correlator 320 mixes 312 the in-phase component of the motion-compensated correlation code 322 with the received digital signal 222 and performs an integration and dump 314 on the result to produce an in-phase correlation result 312. The correlator 310 mixes 312 the quadrature phase motion-compensated correlation code 322 with the same received digital signal 222 and performs an integration and dump 314 on the result to produce the quadrature phase correlation result 312.

It is important to note that the production of in-phase and quadrature phase signals occurs within the motion-compensated correlation code generator 320 when the motion-compensated phasor sequence 332 is produced. The combination (mixing) of the motion-compensated phasor sequence 332 with the correlation code 341 produces the motion-compensated correlation code 322 which is correlated with the received digital signal 222 to produce the correlation output 312.

The integration performed within the correlator 310 produces a positive gain for those received digital signals 222 correlated with the movement signal 361 used to produce the motion-compensated phasor sequence 332. Those received digital signals 222 that are not correlated with the movement signal 361 used to produce the motion-compensated phasor sequence 332 have a poor correlation with the motion-compensated correlation code 322. There is therefore a differential gain applied by the motion-compensated correlator 300 to received digital signals 222 that are received in a direction aligned with the movement of the movement signal 361 used to produce the motion-compensated phase sequences 332 (increased gain) compared to those received digital signals 222 that are received in a direction not aligned with the movement of the movement signal 361. It will therefore be appreciated that the motion-compensated correlator 300 significantly improves correlation performance in multi-path environments.

FIG. 5 schematically illustrates an example of a method 400 performed by the motion-compensated phasor generator 330. At block 402, a velocity is determined. This velocity may be determined by the motion-compensated phasor generator 330 from the movement signal 361 provided by the receiver-motion module 360 or it may be provided by the receiver-motion module 360. The velocity is the velocity of the receiver 200 when receiving the digital signal 222 that is to be correlated. The velocity may be aligned along a particular direction for example a line of sight to a transmitter or a direction in which a strong signal is expected. At block 404 a Doppler frequency shift is calculated using the velocity v to determine a Doppler frequency shift. At block 406, the Doppler frequency shift is integrated over time to determine a phase correction value $\Delta\Phi(t)$. A phasor X(t) is determined at block 408 according to the formulation exp $(i\Delta\Phi(t))$.

By performing the method 400 for each time period $t_n$, corresponding to the sampling times of the digital signal 222 provided by the receiver 200, it is possible to generate a sequence of phasors $\{X(t_n)\}$. Each phasor has the same duration as a sample of the digital signal 222 and there is the same number of phasors $X(t_n)$ in a motion-compensated phasor sequence 332 as there are samples of the digital signal 222 and samples of a correlation code 341. The correlation code 341 may be a series of sequential correlation code words, concatenated to match the duration of the digital signal 222 and the motion-compensated phasor sequence 332. Each phasor X(t) represents a phase compensation based upon the motion of the receiver at time t that is applied to a corresponding sample of the correlation code 341. In this way, the correlation code 341 becomes motion-compensated when the correlation code 341 is combined with the motion-compensated phasor sequence 332.

A phasor X(t) is a transformation in phase space and it is complex valued, producing the in-phase component of the motion-compensated phasor sequence 332 via its real value and the quadrature phase component of the motion-compensated phasor sequence 332 via its imaginary value. The phasor X(t) is a cyclic phasor and may be expressed in a number of different ways, for example as a clockwise rotation from the real axis or as an anti-clockwise rotation from the imaginary axis. Although in this example, the phasor X(t) has a constant amplitude within the motion-compensated phasor sequence 332, in other examples, the phasor may represent both a rotation and a change in amplitude instead of just a rotation. However, in other examples, such as the one illustrated, the phasor is for rotation only.

FIGS. 6A and 6B illustrate an example of a motion-compensated correlation sequence storage system 420 during a write operation (FIG. 6A) and during a read operation (FIG. 6B) and FIG. 6C illustrates a method 470 performed by the motion-compensated correlation sequence storage system 420. The motion-compensated correlation sequence storage system 420 comprises a storage control module 426 which is configured to write to and read from an addressable memory 430. The addressable memory 430 may, in some examples, be part of the motion-compensated correlation sequence storage system 420 and in other examples it may be separate from the motion-compensated correlation sequence storage system 420.

In FIG. 6A, the storage control system 426 receives a movement signal 361 and a motion-compensated correlation sequence 422. The storage control system 426 stores the motion-compensated correlation sequence 422 in the addressable memory 430 in a data structure 432 that is indexed by the movement signal 361. That is, an index dependent upon the movement signal 361 may be used to access and retrieve the motion-compensated correlation sequence 422 from the addressable memory 430.

It will be appreciated that FIG. 6A illustrates a write operation where the storage control system 426 writes the motion-compensated correlation sequence 422 to a memory so that it can be accessed at any later time via an index dependent upon the motion information 361 that corresponds to the motion index associated with the stored motion-compensated correlation sequence 422.

FIG. 6B illustrates an example of a read access performed by the storage control system 426. The storage control system 426 in this example receives movement signal 361 and uses this to produce an index 436 that is sent to the addressable memory 430. If the addressable memory 430 stores a data structure 422 that is associated with the received index then it returns that motion-compensated correlation sequence 422 via a reply signal 438 to the storage control system 426. The storage control system 426 provides the returned motion-compensated correlation sequence 422 to the motion-compensated correlation sequence generator 320 which uses the returned motion-compensated correlation sequence to provide a motion-compensated correlation code 322.

It should be appreciated that in some instances the motion-compensated correlation sequence may be a motion-compensated phasor sequence 332.

It should be appreciated that in some examples the motion-compensated correlation sequence may be a motion-compensated correlation code 322.

FIG. 6C illustrates an example of a method 470 in which at a first time, at block 472, the method 470 stores a motion-compensated correlation sequence in an addressable memory 430. Then, at a later time, at block 474, the method 470 causes addressing of the memory to obtain the stored motion-compensated correlation sequence; and then at block 476, the method 470, causes motion-compensated correlation of a correlation code and a digital signal using the obtained motion-compensated correlation sequence 422.

The motion-compensated correlation sequence 422 is a correlation sequence that has been phase-compensated in dependence upon movement (assumed or measured) of the receiver 200. The motion-compensated correlation sequence 422 may be a motion-compensated phasor sequence 332 comprising a sequence of phasors that have been phased-compensated in dependence upon movement (assumed or measured) of the receiver 200. The motion-compensated correlation sequence 422 may be a motion-compensated correlation code 322 being a correlation code 341 that has been compensated by a sequence of phasors that have been phased-compensated in dependence upon movement (assumed or measured) of the receiver 200.

In this example, the motion-compensated correlation sequence 422 is stored within a data structure 432 in the memory 430. In some examples the data structure 432 may be generated by the motion-compensated correlation sequence generator 320 and provided to the motion-compensated correlation sequence storage system 420 for storage in accordance with the example illustrated in FIG. 6A. However, it is possible for the motion-compensated correlation storage system 420 to obtain the data structure 432 via a different mechanism. For example, the data structure 432 may be provided separately or pre-stored within the storage control system 426 or memory 430.

The data structure 432 is an addressable data structure addressable for read access using a motion-dependent index as described in relation to FIG. 6B. Where the data structure 432 comprises a motion-compensated correlation sequence 422 that is a motion-compensated correlation code 322, then the motion-compensated correlation code 322 may be based upon a reference or standard correlation code, for example, produced by a defined process, e.g. a Gold code or Barker code with defined cross-correlation characteristics. The reference or standard correlation code has been combined with a motion-compensated phasor sequence 332 to produce the motion-compensated correlation code 322.

Figure 7A:
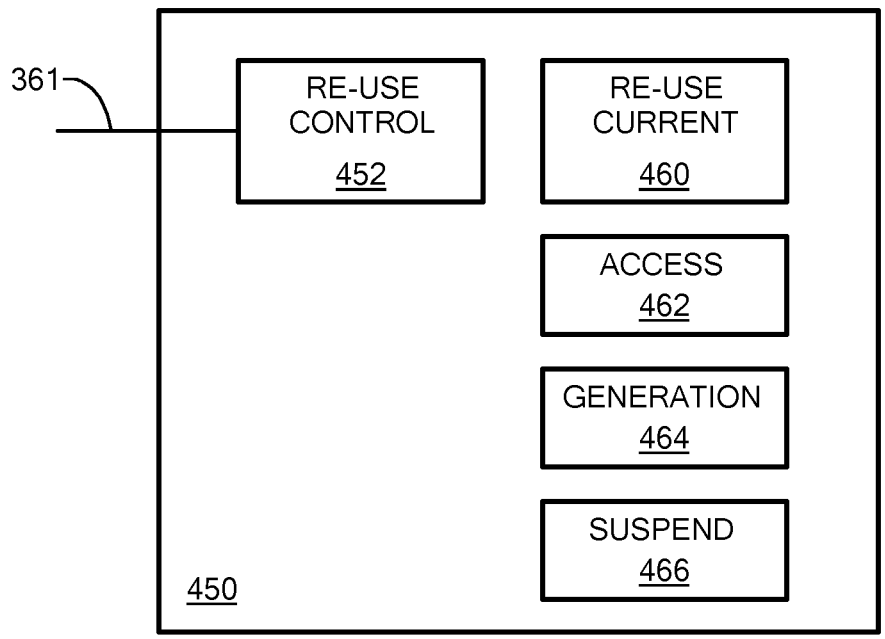
FIG. 7A illustrates an example of a motion-compensated correlation sequence (MCCS) re-use system.

FIG. 7A illustrates an example of a motion-compensated correlation sequence (MCCS) re-use system 450.

The MCCS re-use system 450 receives as an input the movement signal 361 which is used to determine whether a current in use motion-compensated correlation sequence 422 should be re-used for motion-compensated correlation of a received digital signal 222 (re-use current MCCS block 460), and/or whether a previously used/stored motion-compensated correlation sequence 422 should be re-used/used for motion-compensated correlation of a received digital signal 222 (MCCS access block 462) and/or whether a new motion-compensated correlation sequence 422 should be generated for motion-compensated correlation of a received digital signal 222 (MCCS generation block 464) and/or whether motion-compensated correlation of a received digital signal 222 should be suspended (MCCS suspend block 466).

The MCCS re-use system 450 determines if and what motion-correlation should be performed on a received digital signal 222 using the movement signal 361 which indicates movement of the receiver 200 while it was receiving the digital signal 222 that is to be correlated.

While in this example the MCCS re-use system 450 comprises a re-use current MCCS block 460, a MCCS access block 462, a MCCS generation block 464 and a MCCS suspend block 466, in some examples, the MCCS re-use system 450 comprises mores blocks. In some examples, the MCCS re-use system 450 comprises only a sub-set of the blocks 460, 462, 464, 466, which may be any sub-set of one or more blocks 460, 462, 464, 466.

The MCCS re-use system 450 processes the movement signal 361 in MCCS re-use control block 452 to perform one or more tests to determine which of the blocks 460, 462, 464, 466 should be used. For example the MCCS re-use control block 452 may perform a receiver-movement analysis test to determine which of the blocks 460, 462, 464, 466 should be used. For example the re-use control block 452 may perform a receiver-movement comparison test comparing the movement of the receiver 200 represented by the input movement signal 361 with a previous movement of the receiver associated with a motion-compensated correlation sequence 422 to determine which of the blocks 460, 462, 464, 466 should be used.

In some but not necessarily all examples, if the input movement signal 361 is determined to represent an assumed or measured movement of the receiver 200 that is the same as or corresponds to the immediately preceding movement of the receiver 200 then it may be determined by the re-use control block 452 that the trajectory of the receiver 200 is invariant (repeated) and the currently used motion-compensated correlation sequence 422 may be re-used via the re-use current MCCS block 460.

In some but not necessarily all examples, if the input movement signal 361 is determined to represent an assumed or measured movement of the receiver 200 that is the same as or corresponds to an assumed or measured movement of the receiver 200 for which there exists a stored motion-compensated correlation sequence 422 associated with that receiver movement then it is determined by the MCCS re-use control block 452 that there is a receiver trajectory for which there exists a stored motion-compensated correlation sequence 422 and that stored motion-compensated correlation sequence 422 is accessed in the addressable memory 430 and used via the MCCS access block 462. The accessed stored motion-compensated correlation sequence 422 may be a previously used and/or previously generated motion-compensated correlation sequence 422.

The MCCS re-use control block 452 may determine that it is not desirable or possible to use a current/previous/stored motion-compensated correlation sequence 422. For example, the MCCS re-use control block 452 may determine not to use the re-use current MCCS block 460 and not to use the MCCS access block 462.

If the MCCS re-use control block 452 determines that it is still desirable to use motion-compensated correlation then the MCCS re-use control block 452 causes generation of a new motion-compensated correlation sequence 422 via the MCCS generation block 464. The newly generated motion-compensated correlation sequence 422 is then used for motion-compensated correlation and may, in addition, be stored for future access by the motion-compensated correlation sequence storage system 420 as previously described If, however, the MCCS re-use control block 452 determines that conditions are not suitable for motion-compensated correlation, then motion-compensated correlation is suspended at the MCCS suspend block 466 and correlation is performed between the received digital signal 222 and the correlation code 341 without the use of a motion-compensated phasor sequence 332 determined from assumed or measured movement of the receiver 200 via open loop control 350.

Figure 7B:
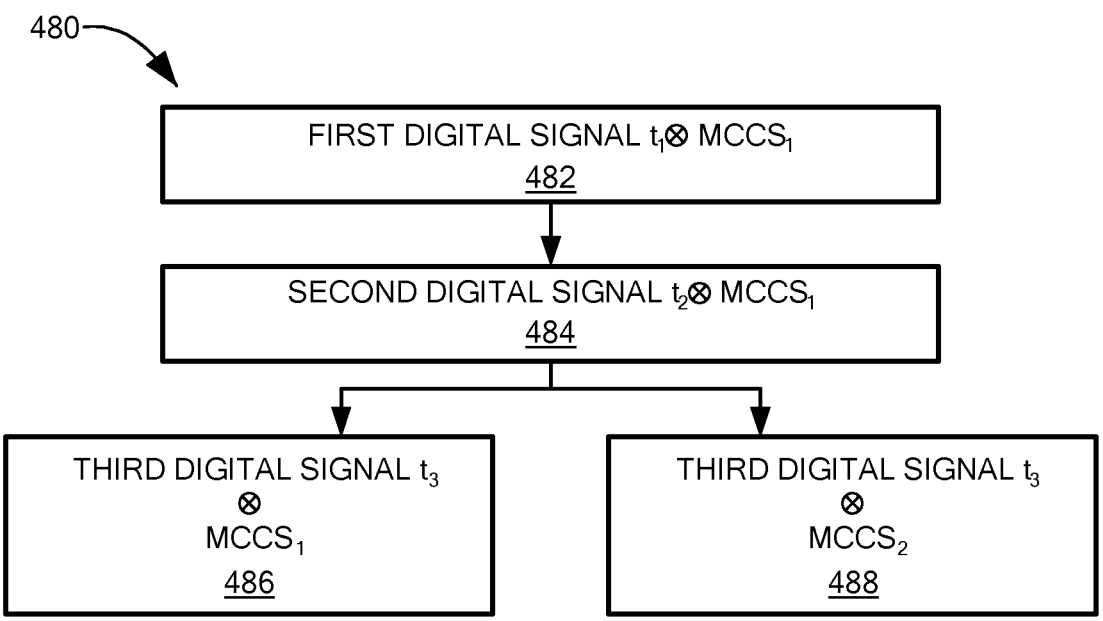
FIG. 7B illustrates an example of a method.

FIG. 7B illustrates a method 480 comprising at block 482, causing or performing correlation of a first digital signal 222, received by a receiver 200 during a first time, with a first motion-compensated correlation sequence 422 dependent upon a first assumed or measured movement of the receiver 200 during the first time; and at block 484 causing or performing correlation of a second digital signal 222, received by a receiver 200 during a second time, non-overlapping with the first time, with the first motion-compensated correlation sequence.

A second assumed or measured movement of the receiver 200 during the second time may be used to access the first motion-compensated correlation sequence 222 from an addressable memory 430.

In another example, the method 480 may at block 486 additionally comprise: causing or performing correlation of a third digital signal 222, received by the receiver 200 during the third time, non-overlapping with the first time and the second time, with the accessed first motion-compensated correlation sequence (block 460 or block 462 in FIG. 7A). The method 480 may comprise causing or performing use of a third assumed or measured movement of a receiver 200 during the third time to access the first motion-compensated correlation sequence from an addressable memory (block 462 in FIG. 7A).

In another example, the method 480 may at block 488 comprise: causing or performing correlation of a third digital signal 222, received by the receiver 200 during a third time, non-overlapping with the first time and the second time, with a second motion-compensated correlation sequence 422 different to the first motion-compensated correlation sequence 422 and dependent upon an assumed or measured movement of the receiver 200 during the third time (block 462 or block 464 in FIG. 7A). The method 480 may comprise causing or performing generation of the second motion-compensated correlation sequence 422 dependent upon an assumed or measured movement of a receiver during the third time (block 464 in FIG. 7A).

The method 480 may comprise causing or performing a comparison test comparing the first assumed or measured movement and the third assumed or measured movement of the receiver 200. When it is determined that the first movement and the third movement pass a comparison test, the method 480 may cause or perform correlating the third digital signal, received at the receiver during the third time, with the first motion-compensation sequence. When it is determined that the first movement and the third movement do not pass a comparison test, the method 480 may cause or perform correlating the third digital signal, received at the receiver during the third time, with the second motion-compensation sequence.

The method 480 may comprise causing or performing a comparison test comparing the first assumed or measured movement and a fourth assumed or measured movement of the receiver during a fourth time during which a fourth digital signal 222 is received (not shown in FIG. 7B). When it is determined that the first movement and the fourth movement do not pass a comparison test, the method 480 may cause or perform correlating the fourth digital signal with a motion-compensated correlation sequence dependent upon the fourth movement or with the correlation code 341. When it is determined that the first movement and the fourth movement pass a comparison test, the method 480 may cause or perform correlating the fourth digital signal with the first motion-compensated correlation sequence.

Where the first motion-compensated correlation sequence 422 is a first motion-compensated correlation code 322, that is a correlation code 341 compensated by a first motion-compensated phasor signal, the second motion-compensated correlation sequence 422 may be the same correlation code 341 compensated by a second, different motion-compensated phasor signal.

Where the first motion-compensated correlation sequence 422 is a first motion-compensated phasor sequence 332, the second motion-compensated correlation sequence 422 is a second, different motion-compensated phasor sequence. However, the first motion-compensated phasor sequence 332 and the second motion-compensated phasor sequence 332 may be used to compensate the same correlation code 341 to produce different motion-compensated correlation codes 322.

In this way, it may be possible to re-use an existing motion-compensated correlation sequence 422 for an extended period of time. In the case of static signal sources, such as terrestrial radio transmitters, or geostationary satellites, the period of time may be without bound. For moving transmitters, such as GNSS satellites, the reusability will decrease over time, as the Doppler shift of the signal changes relative to the one recorded in the MCCS. In this instance the sequences may be reusable for perhaps for as long as 10 or more seconds. Where the correlation code 341 has a length of 1 ms., that is a duration of longer than 10,000 periods of the correlation code 341.

It will be appreciated that the storage of the motion-compensated correlation sequence 422 for re-use may significantly reduce a computational load required to perform motion-compensated correlation.

As described in relation to FIG. 7A, the motion-compensated correlation sequence re-use system 450 may intelligently decide whether or not to perform motion-compensated correlation and, if it is to perform motion-compensated correlation, whether it is to generate a new motion-compensated correlation sequence 422 or whether it should re-use a motion-compensated correlation sequence 422 and, if it should re-use a motion-compensated correlation sequence 422, whether it should re-use the currently used motion-compensated correlation sequence 422 or whether it should re-use a stored motion-compensated correlation sequence 422. The re-use of a motion-compensated correlation sequence 422 is particularly advantageous where the receiver 200 is often involved in the same motion whether on a continual or intermittent basis. For example, if a pedestrian is walking with a particular direction and with a particular gait this may be detected and used as a movement signal 361 to determine whether or not to re-use a motion-compensated correlation sequence 422. Particular well-defined triggers in the motion data, such as the heel strike of pedestrian walking motion, can be used to mark the beginning of reusable sections of motion-compensated correlation sequences, and to detect the moments in the future when the sections can be reused. Other aspects can be tested for similarity, such as compass heading, orientation, speed, etc. It would therefore be possible to re-use a motion-compensated correlation sequence 422 while a person is walking in the same direction while they maintain the same trajectory, i.e. the same bearing and walking speed. A detection of a change in the bearing, the stride length, the gait or the stride rate may cause an interrupt at the re-use system 450 which may then switch from using the re-use current MCCS block 460, to using one or the other blocks 462, 464, 466.

Figure 8:
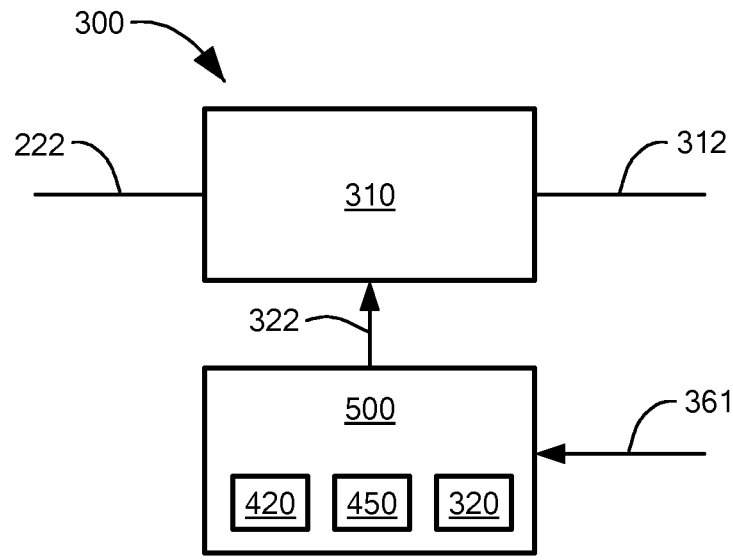
FIG. 8 illustrates an example of a motion-compensated correlator.

FIG. 8 illustrates a motion-compensated correlator 300 comprising a motion-compensated correlation sequence (MCCS) system 500 comprising a motion-compensated correlation sequence (MCCS) storage system 420, a motion-compensated correlation sequence (MCCS) re-use system 450 and a motion-compensated correlation sequence (MCCS) generator 320, all as previously described. The system 500 uses the re-use system 450 to determine whether or not to perform motion-compensated correlation and if it is to perform motion-compensated correlation then whether it is to generate a new motion-compensated correlation sequence 422 or to re-use a motion-compensated correlation sequence 422. If it is to re-use a stored motion-compensated correlation sequence then the re-use system 450 provides the movement signal 361 received by the system 500 to the storage system 420 which performs a read access on a addressable memory 430 to obtain the motion-compensated correlation sequence 422. The motion-compensated correlation sequence 422 read from the memory 430 is provided to the motion-compensated correlation sequence generator 320 if it is a motion-compensated phasor sequence to produce a motion-compensated correlation code 322 for the correlator 310 or is provided directly to the correlator 310 if it is a motion-compensated correlation code 322. When a new motion-compensated correlation sequence 422 is required to be generated, the re-use system 450 controls the motion-compensated correlation sequence generator 320 to generate a motion-compensated correlation sequence 422 and to use that sequence for correlation of the digital signal 222. The generated motion-compensated correlation sequence 422 may then be provided to the storage system 420 for storage in the addressable memory 430.

Figure 9:
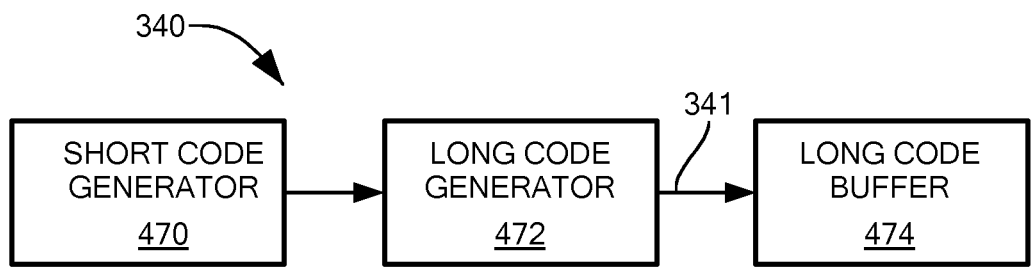
FIG. 9 illustrates an example of a long correlation code generator.
Figure 10:
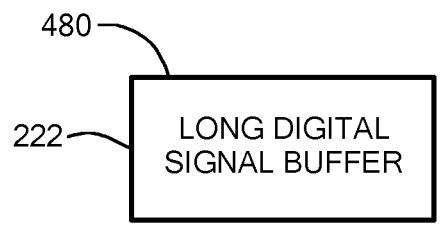
FIG. 10 illustrates an example of a long digital signal buffer.

FIG. 9 illustrates an example of a correlation code generator 340 that provides a correlation code 341 that may be used for motion-compensated correlation as described above. The correlation code 341 is a long correlation code as described below. A short code generator 470 produces a correlation code 341'. A long code generator 472 concatenates the correlation code 341' multiple times to produce the long correlation code 341. The long correlation code may be stored in a buffer memory 474 that is of sufficient size to temporarily store a concatenation of multiple correlation codes 341'. FIG. 10 illustrates an example of a long digital signal buffer 480 that temporarily stores a received digital signal 222 that may be used for motion-compensated correlation as described above. This is a buffer memory 474 that is of sufficient size to temporarily store received digital signal 222 that has a duration as long as the long correlation code 341.

The digital signal 222 is a long digital signal, the correlation code 341 is a long correlation code, the motion-compensated correlation code 322 is a long motion-compensated correlation code.

The long digital signal 222, the long correlation code 341 and the long motion-compensated correlation code 322 have the same length. Each having a duration greater than a length of the correlation code word e.g. greater than 1 ms for GPS or greater than 4 ms for GALILEO. For example, the duration may be N*1 ms or M*4 ms where N, M are natural numbers greater than 1. It may in some examples be possible to change the duration, for example, in dependence upon confidence of receiver motion measurement. It may in some examples be possible to increase and/or decrease N or M. It may in some examples be possible to select between having a duration N*1 ms or M*4 ms. A longer duration increases correlation time providing better gain.

The long correlation code 341 is a concatenation of multiple ones of a same first correlation code 341'.

The first correlation code 341' may be a standard or reference code e.g. a Gold code, Barker code or a similar that has a fixed period T and predetermined cross-correlation properties.

A long motion-compensated correlation sequence 422 may be referred to as a supercorrelation sequence. A supercorrelation sequence may be a long motion-compensated phasor sequence or a long motion-compensated correlation code (phasor adjusted).

Figure 11:
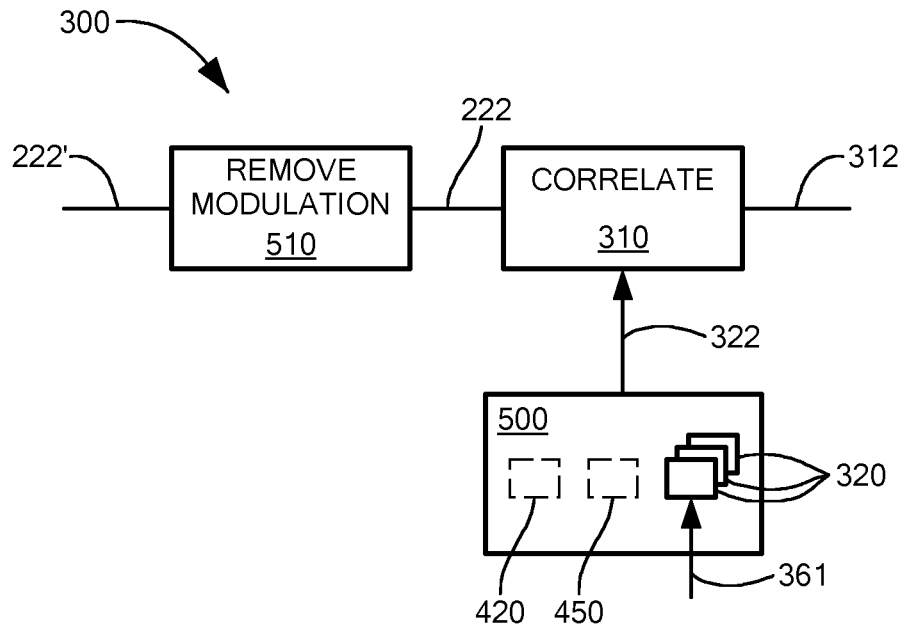
FIG. 11 illustrates an example of a motion-compensated correlator.

FIG. 11 illustrates an example of a motion-compensated correlator 300 comprising a motion-compensated correlation sequence (MCCS) system 500 optionally comprising a motion-compensated correlation sequence (MCCS) storage system 420, optionally comprising a motion-compensated correlation sequence (MCCS) re-use system 450 and comprising multiple motion-compensated correlation sequence (MCCS) generators 320.

Each of the multiple motion-compensated correlation code generators 320 generates a long motion-compensated correlation code 322 which is a long correlation code 341 that has been compensated, before correlation, using the same long motion-compensated phasor sequence 332 dependent upon an assumed or measured movement of the receiver 200.

A first one of the multiple motion-compensated correlation code generators 320 produces an early long motion-compensated correlation code 322 which is a long correlation code 341 that has been compensated, before correlation, using the same long motion-compensated phasor sequence 332 dependent upon an assumed or measured present movement of the receiver 200 and time shifted to be early.

A second one of the multiple motion-compensated correlation code generators 320 produces a present (prompt) long motion-compensated correlation code 322 which is a long correlation code 341 that has been compensated, before correlation, using the same long motion-compensated phasor sequence 332 dependent upon an assumed or measured present movement of the receiver 200.

A third one of the multiple motion-compensated correlation code generators 320 produces a late long motion-compensated correlation code 322 which is a long correlation code 341 that has been compensated, before correlation, using the same long motion-compensated phasor sequence 332 dependent upon an assumed or measured present movement of the receiver 200 and time shifted late.

Each of the early long motion-compensated correlation code, present (prompt) long motion-compensated correlation code and late long motion-compensated correlation code are separately correlated with the same long digital signal 222.

The motion-compensated correlator 300 is suitable for use in a global navigation satellite system (GNSS) where the received digital signal 222 is transmitted by a GNSS satellite. The motion-compensated correlator 300 may be part of a GNSS receiver 200.

In some but not necessarily all examples, down-conversion of a received signal before analogue to digital conversion to create the digital signal 222 occurs, in other examples it does not. Where down-conversion of a received signal before analogue to digital conversion to create the digital signal 222 occurs, in some but not necessarily all examples, the down-conversion is independent of a measured movement of the receiver 200 and is not controlled in dependence upon the measured movement of a receiver 200 of the received signal.

In some but not necessarily all examples a modulation removal block 510 may remove any data that has been modulated onto the signals being coherently integrated using the motion-compensated correlator. An example of this is the removal of the navigation bits from a received GNSS digital signal 222' to produce the digital signal 222 processed by the motion-compensated correlator 300.

In this example, the correlation code concatenated to produce the long correlation code 341 is a chipping code (a pseudorandom noise code). It may for example be a Gold code.

Each GNSS satellite may use a different long correlation code 341 in some examples. Multiple motion-compensated correlators 300 may be provided and may be assigned to different satellites. A motion-compensated correlator 300 then performs motion-compensated correlation for the assigned GNSS satellite.

Referring back to FIG. 5, the velocity v may then be the line of sight velocity of the receiver 200 towards the assigned satellite. The motion-compensated correlator 300 then has selective increased gain for the digital signals 222 received from that satellite along the line of sight.

Figure 12:
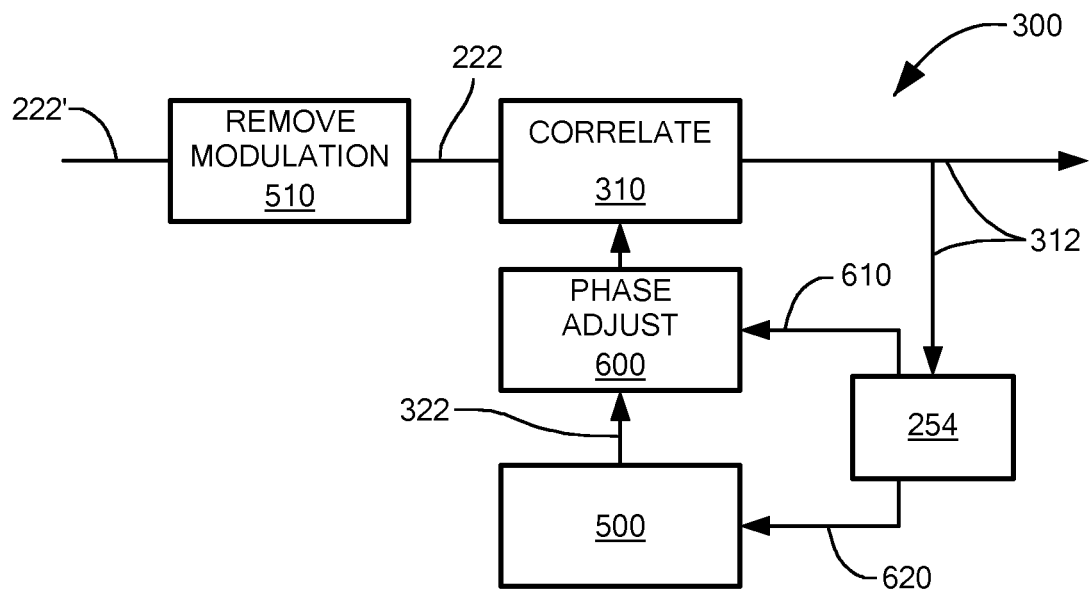
FIG. 12 illustrates an example of a motion-compensated correlator.

In some example, movement of the assigned satellite may be compensated by using as the velocity v the line of sight relative velocity between the receiver 200 and the assigned satellite. In other examples, movement of the assigned satellite may be compensated by using closed control loop as illustrated in FIG. 12. Correlating the digital signal 222 provided by the receiver 200 with the long motion compensated correlation code 322 additionally uses one or more closed control loops 610, 620 for maintenance of code-phase alignment and/or carrier-phase alignment 620.

A control system 254 uses the results 312 of motion-correlated correlation to provide a closed-loop control signal 610 and/or a closed loop control signal 620.

A closed-loop control signal 610 controls a phase adjust module 600 to adjust the phase of the motion-compensated correlation codes 322 to maintain carrier phase alignment.

Figure 13:
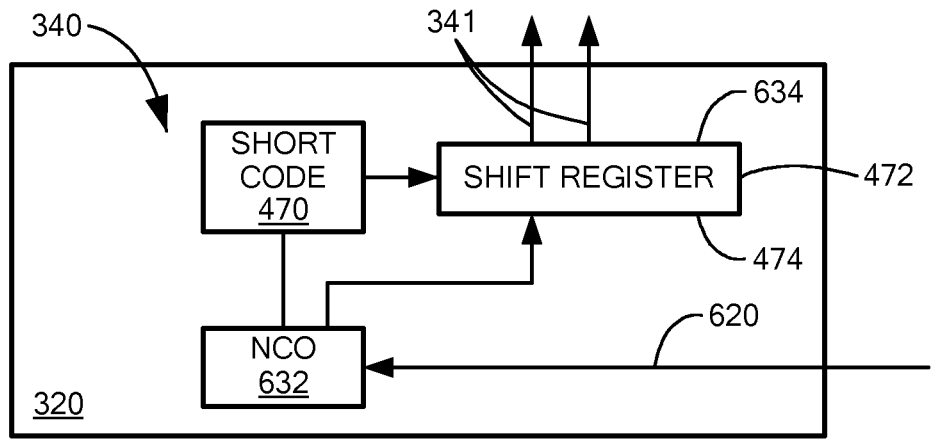
FIG. 13 illustrates an example of a motion-compensated correlation code generator.

A closed-loop control signal 620 controls each of the multiple motion-compensated correlation code generators 320 for the satellite to maintain code phase alignment. FIG. 13 illustrates an example of how motion-compensated correlation code generators 320 may maintain code-phase alignment via a closed loop control signal 620. A numerical controlled oscillator 632 receives the control signal 620 and controls the long correlation code generator 340 using the short code generator 470 and a shift register 634 that buffers the long correlation code 341 and simultaneously operates as long code generator 472 and long code buffer 474 for the multiple motion-compensated correlation code generators 320 used for a particular satellite.

Figure 14A:
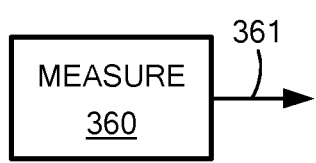
FIGS. 14A and 14B illustrate different examples of a receiver-motion module for producing a movement signal.
Figure 14B:
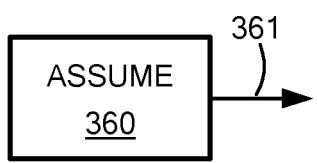

FIGS. 14A and 14B illustrate different examples of a receiver-motion module 360 for producing a movement signal 361 indicative of a movement of the receiver 200 during a particular time duration. The receiver-motion module 360 illustrated in FIG. 14A produces a movement signal 361 indicative of a measured movement of the receiver 200. The receiver-motion module 360 illustrated in FIG. 14B produces a movement signal 361 indicative of an assumed movement of the receiver 200.

The movement signal 361 may be a parameterized signal defined by a set of one or more parameters.

The receiver-motion module 360 may, for example, be used to determine a velocity of a pedestrian or a vehicle The receiver-motion module 360 that measures the receiver movement as illustrated in FIG. 14A may have a local navigation or positioning system that tracks motion of the receiver 200, such as a pedestrian dead reckoning system, an inertial measurement system, a visual tracking system, or a radio positioning system An inertial measurement system typically calculates velocity by integrating acceleration measurements from inertial sensors such as multi-axis accelerometers and gyroscopes.

A pedestrian dead reckoning system may detect a step from for the example a heel strike, estimation step/stride length, estimate a heading, and determine a 2D position.

A radio positioning system may, for example, use Wi-Fi positioning and/or Bluetooth positioning.

The receiver-motion module 360 that assumes the receiver movement, illustrated in FIG. 14B, may have a context detection system that detects a context of the receiver 200 such as a specific location at a specific time and determines a receiver velocity on a past history of the receiver velocity for the same context. A learning algorithm may be used to identify re-occurring contexts when the receiver velocity is predictable and to then detect that context to estimate the receiver velocity.

Figure 15:
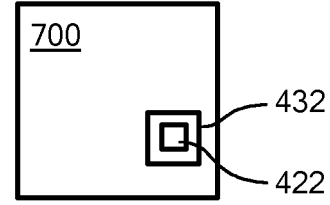
FIG. 15 illustrates an example of a record medium.

FIG. 15 illustrates an example of a record medium 700 such as a portable memory device storing a data structure 432. The data structure 432 comprises: a motion-compensated correlation sequence 422 that is a combination of a (long) correlation code 341 and a (long) motion-compensated phasor sequence 332 or is a (long) motion-compensated phasor sequence 332. The record medium 700 and the data structure 432 enables transport of the motion-compensated correlation sequence 422. The data structure 432 may be configured as a data structure addressable for read access using a motion-dependent index.

In some but not necessarily all examples, the long motion-compensated correlation sequence 422 is a combination of a long correlation code 341 and a long motion-compensated phasor sequence 332 and the long correlation code 341 is a concatenation of multiple ones of the same standard correlation code.

A controller 800 may be used to perform one or more of the before described methods, the before described blocks and or all or part of a motion-compensated correlator 300.

Implementation of a controller 800 may be as controller circuitry. The controller 800 may be implemented in hardware alone, have certain aspects in software including firmware alone or can be a combination of hardware and software (including firmware).

Figure 16A:
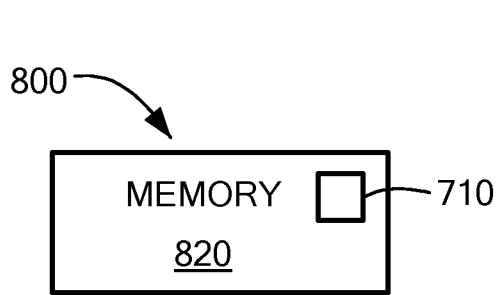
FIG. 16A illustrates an example of a controller.

As illustrated in FIG. 16A the controller 800 may be implemented using instructions that enable hardware functionality, for example, by using executable computer program instructions 710 in a general-purpose or special-purpose processor 810 that may be stored on a computer readable storage medium (disk, memory etc) to be executed by such a processor 810.

The processor 810 is configured to read from and write to the memory 820. The processor 810 may also comprise an output interface via which data and/or commands are output by the processor 810 and an input interface via which data and/or commands are input to the processor 810.

The memory 820 stores a computer program 710 comprising computer program instructions (computer program code) that controls the operation of all or part of a motion-compensated correlator 300 when loaded into the processor 810. The computer program instructions, of the computer program 710, provide the logic and routines that enables the apparatus to perform the methods illustrated in FIGS. 3 to 18. The processor 810 by reading the memory 820 is able to load and execute the computer program 710.

An apparatus comprising the controller may therefore comprise:

at least one processor 810; and at least one memory 820 including computer program code 710 the at least one memory 820 and the computer program code 710 configured to, with the at least one processor 810, cause the apparatus at least to perform:

(i) causing correlation of a digital signal 222 provided by a receiver 200 with a motion-compensated correlation code 322, wherein the motion-compensated correlation code 322 is a correlation code 341 that has been compensated before correlation using one or more phasors 332 dependent upon an assumed or measured movement of the receiver 200; and/or (ii) at a first time, causing or performing storing a motion-compensated correlation sequence 422 in an addressable memory 430;
  at a later time, causing or performing addressing the memory 430 to obtain the stored motion-compensated correlation sequence 422; and
  causing or performing motion-compensated correlation of a correlation code 341 and a digital signal 222 using the obtained motion-compensated correlation sequence 422; and/or (iii) causing or performing correlation of a first digital signal 222, received by a receiver 200 during a first time, with a first motion-compensated correlation sequence 422 dependent upon a first assumed or measured movement of a receiver 200 during the first time; and
  causing or performing correlation of a second digital signal 222, received by the receiver 200 during a second time, non-overlapping with the first time, with the first motion-compensated correlation sequence 422; and/or (iv) causing or performing correlation of a long digital signal with a long correlation code, wherein the long digital signal and the long correlation code are the same length and the long correlation code is a concatenation of a same first correlation code, wherein the long correlation code has been motion-compensated before correlation, using one or more phasors dependent upon an assumed or measured movement of the receiver.

Figure 16B:
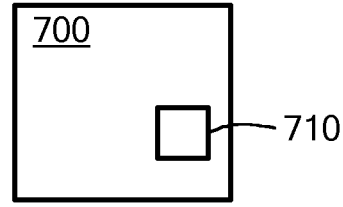
FIG. 16B illustrates an example of a computer program.

As illustrated in FIG. 16B, the computer program 710 may arrive at the apparatus 800 via any suitable delivery mechanism 700. The delivery mechanism 700 may be, for example, a non-transitory computer-readable storage medium, a computer program product, a memory device, a record medium such as a compact disc read-only memory (CD-ROM) or digital versatile disc (DVD) or solid state memory, an article of manufacture that tangibly embodies the computer program 710. The delivery mechanism may be a signal configured to reliably transfer the computer program 710. The apparatus 800 may propagate or transmit the computer program 710 as a computer data signal.

Although the memory 820 is illustrated as a single component/circuitry it may be implemented as one or more separate components/circuitry some or all of which may be integrated/removable and/or may provide permanent/semi-permanent/dynamic/cached storage.

Although the processor 810 is illustrated as a single component/circuitry it may be implemented as one or more separate components/circuitry some or all of which may be integrated/removable. The processor 810 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 17:
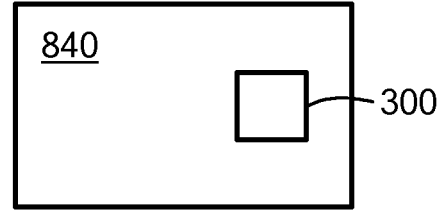
FIG. 17 illustrates an example of a chip-set.

As illustrated in FIG. 17, a chip set 840 may be configured to provide functionality of the controller 800, for example, it may provide all or part of a motion-compensated correlator 300.

The blocks illustrated in the FIGS. 3 to 18 may represent steps in a method and/or sections of code in the computer program 710. The illustration of a particular order to the blocks does not necessarily imply that there is a required or preferred order for the blocks and the order and arrangement of the block may be varied. Furthermore, it may be possible for some blocks to be omitted.

The components of an apparatus or system required to perform one or more of the before described methods, the before described blocks and or all or part of a motion-compensated correlator 300, need not be collocated, and data may be shared between components via one or more communication links.

Figure 18A:
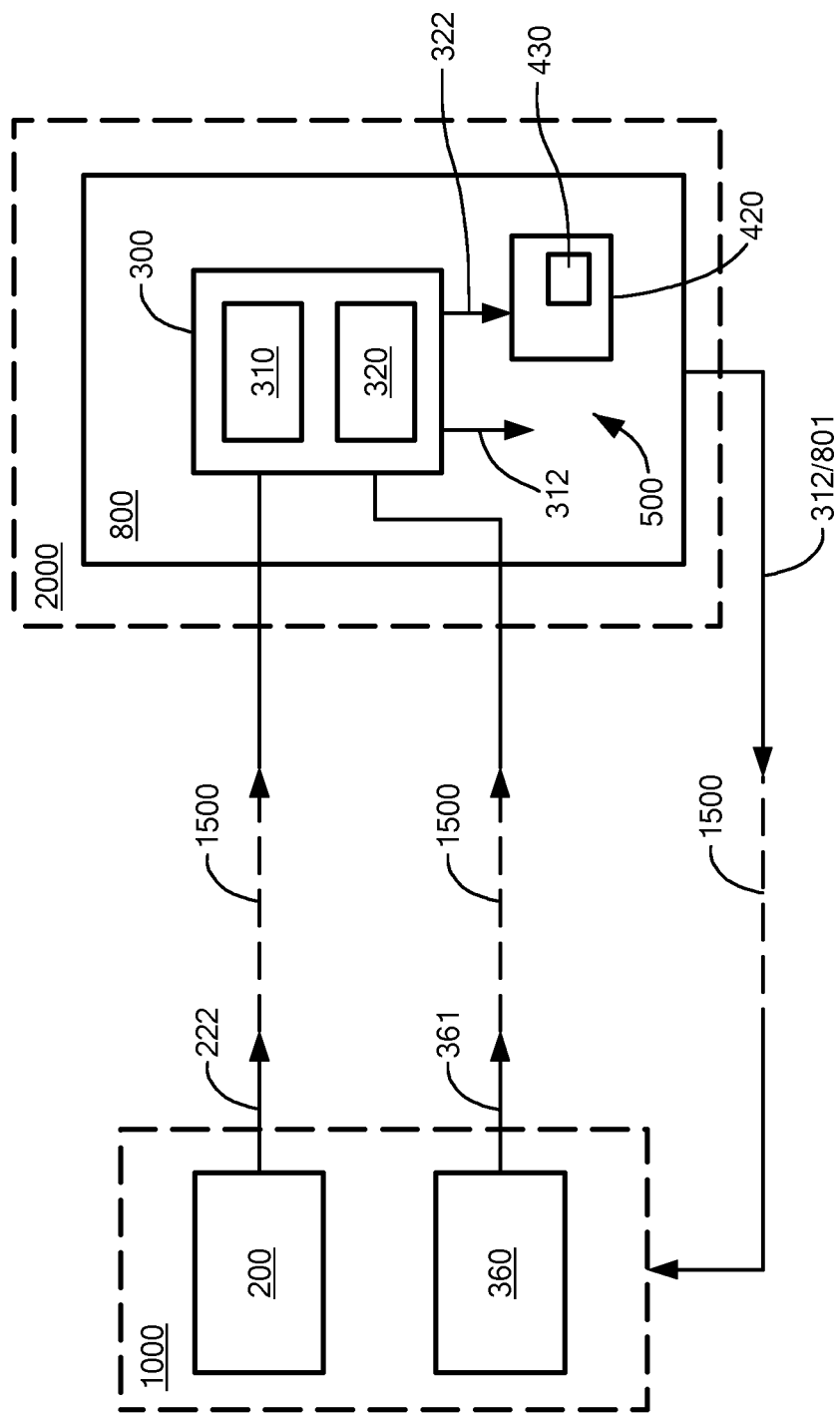
FIGS. 18A, 18B, 18C illustrates examples of a system, comprising a remote device and a remote processing system, that have different distributions of functions between the remote device and the remote processing system.

FIG. 18A illustrates one example of a system comprising a remote device 1000 and a remote processing system 2000. The remote device 1000 comprises the receiver 200 and the receiver motion module 360. The receiver motion module 360 comprises receiver motion sensors that provide receiver motion sensor data as the movement signal 361. The remote device 1000 is physically distant from the remote processing system 2000 comprising the controller 800. The remote device 1000 and the remote device 2000 communicate via communications link(s) 1500. The communications link(s) 1500 may comprise of, for example, wireless communications (e.g. WiFi, BLE, Cellular Telephony, Satellite comms), cabled communications (e.g. Ethernet, landline telephone, fibre optic cable), physical storage media that may be transported between components (e.g. solid state memory, CD-ROM) or any combination thereof.

The digital signal 222 is provided by the remote device 1000 to the remote processing system 2000 via the communications link(s) 1500. The receiver motion sensor data is provided as movement signal 361 by the remote device 1000 to the remote processing system 2000 via the communications link(s) 1500.

The controller 800 of the remote processing system 2000 comprises the motion-compensated correlator 300 comprising the correlator 310 and the motion-compensated correlation sequence generator 320.

The motion-compensated correlation sequence generator 320 generates the motion-compensated correlation sequence 322 from processing of the movement signal 361, and the correlator 310 performs motion-compensated correlation of the digital signal 222 using the motion-compensated correlation sequence 322 to produce correlation result 312.

The motion-compensated correlation sequence generator 320, may optionally be part of a motion-compensated correlation sequence (MCCS) system 500 and the motion-compensated correlation sequence 322 may optionally be stored by a motion-compensated correlation sequence storage system 420 in an addressable memory 430 of the remote processing system 2000 for re-use.

In some but not necessarily all examples, the correlation result 312 is returned to the remote device 1000 via the communications link(s) 1500.

In some but not necessarily all examples, the motion-compensated correlation sequence 322 is returned to the remote device 1000 via the communications link(s) 1500.

In some but not necessarily all examples, the controller 800 performs additional post-processing of the correlation results 312 to derive higher-value outputs 801 (e.g. GNSS pseudoranges or position fixes from GNSS signals) that are transferred to the remote device 1000 via communications link(s) 1500.

Figure 18B:
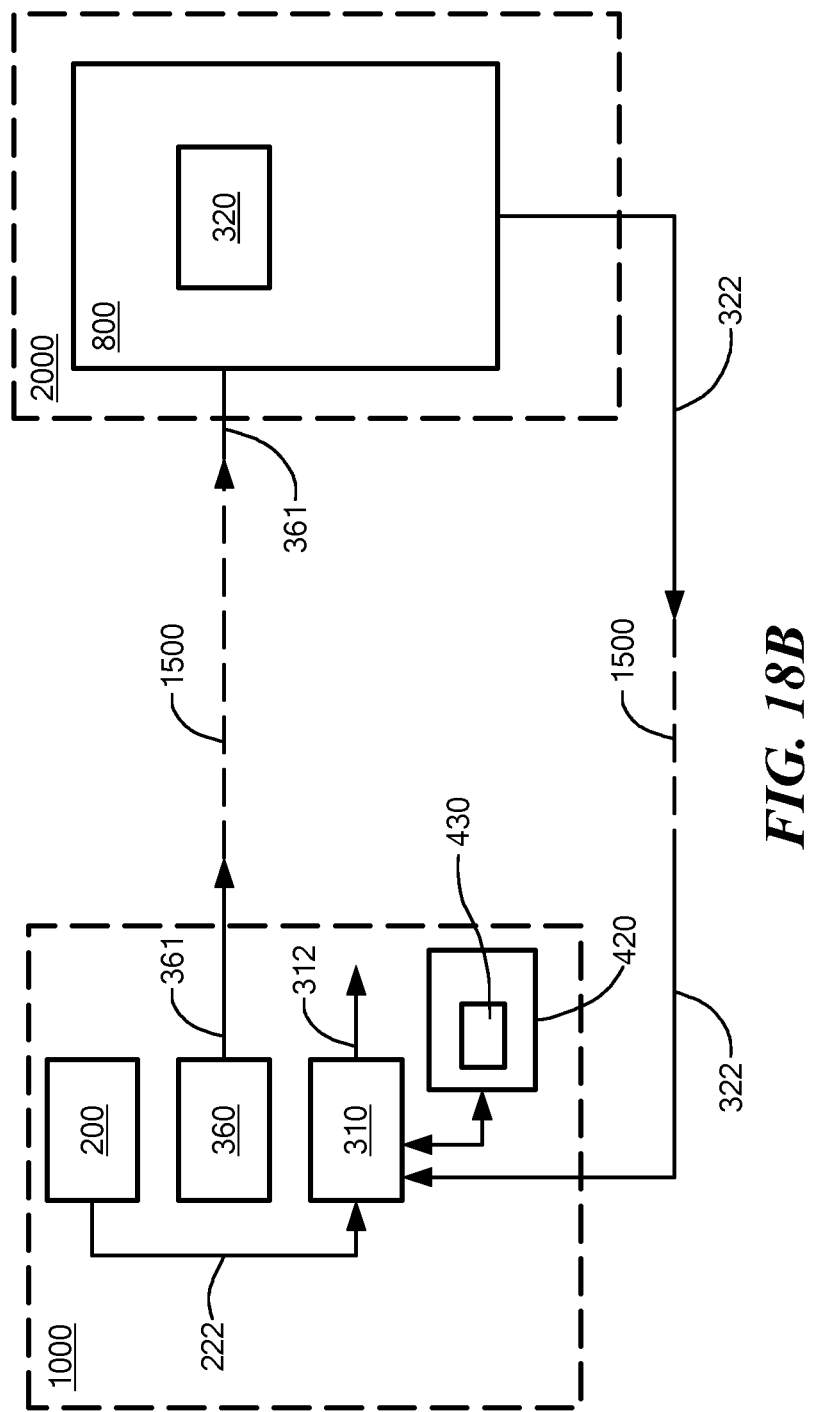

FIG. 18B illustrates another example of a system comprising a remote device 1000 and a remote processing system 2000. The remote device 1000 comprises the receiver 200 and the receiver motion module 360. The receiver motion module 360 comprises receiver motion sensors that provide receiver motion sensor data as the movement signal 361. The remote device 1000 is physically distant from the remote processing system 2000 comprising the controller 800. The remote device 1000 and the remote device 2000 communicate via communications link(s) 1500. The communications link(s) 1500 may comprise of, for example, wireless communications (e.g. WiFi, BLE, Cellular Telephony, Satellite comms), cabled communications (e.g. Ethernet, landline telephone, fibre optic cable), physical storage media that may be transported between components (e.g. solid state memory, CD-ROM) or any combination thereof.

The receiver motion sensor data is provided as movement signal 361 by the remote device 1000 to the remote processing system 2000 via the communications link(s)1500.

Part of the motion-compensated correlator 300 (correlator 310) is in the remote device 1000 and part (motion-compensated correlation sequence generator 320) is in the remote processing system 2000.

The motion-compensated correlation sequence generator 320 in the remote processing system 2000 generates a motion-compensated correlation sequence 322 from processing of the received movement signal 361. The motion-compensated correlation sequence 322 is transferred from the remote processing system 2000 to the remote device 100 via the communications link(s) 1500.

The digital signal 222 is not provided by the remote device 1000 to the remote processing system 2000 via the communications link(s) 1500. Instead it is provided to the correlator 310 in the remote device 1000. The correlator 310 performs motion-compensated correlation of the digital signal 222 using the transferred motion-compensated correlation sequence 322 to produce correlation result 312.

At the remote device 1000, the motion-compensated correlation sequence 322 may optionally be stored by a motion-compensated correlation sequence storage system 420 in an addressable memory 430 of the remote processing system 1000 for re-use.

In a variation of the above described examples, the receiver motion module 360 may be configured to processes the receiver motion sensor data to derive a measured or assumed receiver motion value that is provided as movement signal 361. This processed movement signal 361 may be passed to the remote processing system 2000 instead of the raw receiver motion sensor data, removing the need for the remote processing system 2000 to calculate the receiver motion from the receiver motion sensors data.

In a variation of the above described examples, the receiver motion module 360 may not be located at the remote device 1000, but may be located elsewhere, for example, at the remote processing system 2000 or elsewhere.

Figure 18C:
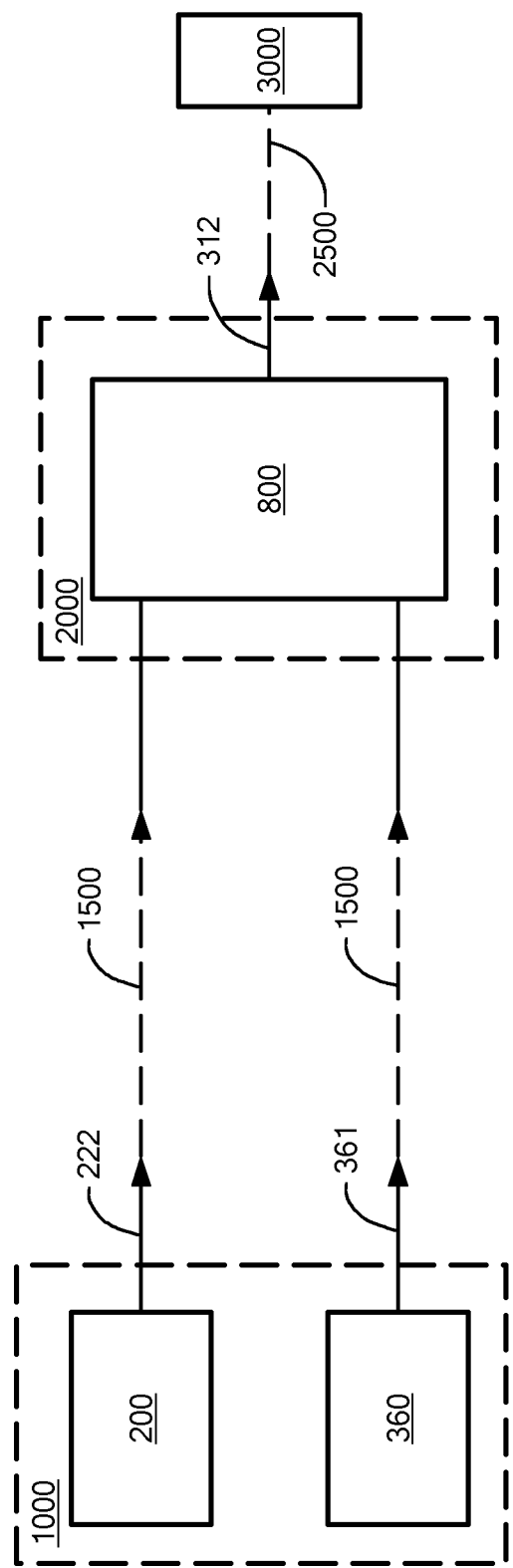

FIG. 18C illustrates another example of a system comprising a remote device 1000 and a remote processing system 2000. This system is similar to that illustrated in FIG. 18A, however, the correlation results 312 (and/or higher value outputs 801) are not provided to the remote device 1000. The correlation results 312 (and/or higher value outputs 801) are utilised/stored at the remote processing system 2000, or are provided to remote third-party clients 3000 via communications link(s) 2500 for further use/processing/storage.

It should be understood that the above examples may be further modified to include a plurality of remote devices 1000, and/or a plurality of remote processing systems 2000 and/or a plurality of remote third party clients 3000, all connected by a plurality of communications links 1500/2500.

The receiver 200 and the motion-compensated correlator 300 previously described and illustrated may, for example, be used for GNSS systems, radio systems (e.g. OFDM, DVB-T, LTE), sonar systems, laser systems, seismic systems etc.

The term 'causing or performing' as it appears in the claims may mean to cause but not perform, to perform but not cause or to cause and perform. If an entity causes an action it means removal of the entity would mean that the action does not occur. If an entity performs an action the entity carries out the action.

The interconnection of items in a Figure indicates operational coupling and any number or combination of intervening elements can exist (including no intervening elements).

Where a structural feature has been described, it may be replaced by means for performing one or more of the functions of the structural feature whether that function or those functions are explicitly or implicitly described.

As used here 'hardware module' refers to a physical unit or apparatus that excludes certain parts/components that would be added by an end manufacturer or a user. A motion-compensated correlator 300 may be a hardware module. A motion-compensated correlation sequence generator 320 may be or may be part of a hardware module. A motion-compensated phasor generator 330 may be or may be part of a hardware module. A correlation code generator 340 may be or may be part of a hardware module. A receiver-motion module 360 may be or may be part of a hardware module. A correlator 310 may be or may be part of a hardware module. A motion-compensated correlation sequence storage system 420 may be or may be part of a hardware module. A (MCCS) re-use system 450 may be or may be part of a hardware module. A motion-compensated correlation sequence (MCCS) system 500 may be or may be part of a hardware module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A positioning system, comprising:
   a local oscillator configured to provide a local frequency or phase reference;
   a receiver configured to receive a first reference signal from a first reference source in a first reference direction, the first reference signal having a received frequency and a received phase, wherein the first reference source provides the first reference signal at a known or predictable frequency or phase, and wherein the receiver is configured to receive a first positioning signal from a first positioning source in a first positioning direction, which is a line-of-sight direction from the first positioning source to the receiver; and a processor configured to:
provide a measured or assumed movement of the receiver in the first reference direction;
provide a plurality of phasors, each phasor in the plurality of phasors comprising a corresponding amplitude and a corresponding angle indicative of a measured or assumed movement of the receiver in the first positioning direction;
provide a movement of the first reference source in the first reference direction;
calculate an offset to the received frequency or the received phase from the first reference source based on the measured or assumed movement of the receiver in the first reference direction and the movement of the first reference source in the first reference direction, wherein the offset accounts for an error in the local frequency or phase reference provided by the local oscillator;
use the local frequency or phase reference from the local oscillator, and the offset, to provide at least a first local signal;
provide a first correlation signal by correlating the first local signal with the first positioning signal; and
provide motion compensation of at least one of the first local signal, the first positioning signal, or the first correlation signal based on the measured or assumed movement of the receiver in the first positioning direction by combining at least one of the first local signal, the first positioning signal, or the first correlation signal with the plurality of phasors in such a manner as to provide preferential gain for a signal received in the first positioning direction in comparison with a signal received by the receiver in a second direction, which is not the line-of-sight direction from the first positioning source to the receiver.

2. The positioning system of claim 1, further comprising an inertial sensor configured to provide a measured movement of the receiver in the first reference direction.

3. The positioning system of claim 1, wherein the first reference source is a terrestrial transmitter.

4. The positioning system of claim 1, wherein the first reference source is a first reference satellite.

5. The positioning system of claim 4, wherein the processor is further configured to select the first reference satellite based on a comparison of its elevation angle with a threshold.

6. The positioning system of claim 1, wherein the processor is further configured to select the first reference source based on a determination that the first reference signal can be received at the receiver along an unobstructed path.

7. The positioning system of claim 1, wherein the processor is further configured to:
identify a first time period based on measured movement of the receiver that corresponds to a time period of relative stability of the local oscillator,
identify a second time period based on measured movement of the receiver that corresponds to a time period of relative instability of the local oscillator, and
provide the first correlation signal by correlating the first local signal with the first positioning signal, wherein the first local signal is provided during the first time period and wherein the first positioning signal is received during the first time period.

8. The positioning system of claim 7, wherein the second time period corresponds to measured movements of the receiver having an acceleration that is above a threshold value.

9. The positioning system of claim 1, comprising at least two receivers.

10. The positioning system of claim 1, wherein the processor is further configured to calculate a plurality of offsets to the received frequency or the received phase as a function of time, wherein the sequence of offsets represents changes in behavior of the local oscillator over a period of time for coherent integration of the first positioning signal.

11. The positioning system of claim 1, wherein the plurality of phasors comprises one phasor for each sample of the at least one of the first local signal, the first positioning signal, or the first correlation signal.

12. The positioning system of claim 1, wherein the processor is further configured to mark reusable sections of the at least one of the motion-compensated first local signal, the first positioning signal, or the first correlation signal.

13. The positioning system of claim 1, wherein the processor is configured to detect accelerations of the receiver and to coherently integrate the first positioning signal between accelerations.

14. The positioning system of claim 1, wherein the processor is configured to provide motion compensation of at least one of the first local signal, the first positioning signal, and the first correlation signal using open-loop control.

15. A method, performed in a positioning system, comprising the steps of:
providing a local frequency or phase reference using a local oscillator;
receiving, at a receiver, a first reference signal from a first reference source in a first reference direction, the first reference signal having a received frequency and a received phase, wherein the first reference source provides the first reference signal at a known or predictable frequency or phase;
receiving, at the receiver, a first positioning signal from a first positioning source in a first positioning direction, which is a line-of-sight direction from the first positioning source to the receiver;
providing a measured or assumed movement of the receiver in the first reference direction;
providing a movement of the first reference source in the first reference direction;
calculating a sequence of offsets to the received frequency or the received phase as a function of time, based on the measured or assumed movement of the receiver in the first reference direction and the movement of the first reference source in the first reference direction, wherein the sequence of offsets represents changes in behavior of the local oscillator over a period of time for coherent integration of the first positioning signal, thereby accounting for an error in the local frequency or phase reference provided by the local oscillator;
using the local frequency or phase reference from the local oscillator, and the sequence of offsets, to provide at least a first local signal;
providing a plurality of phasors, each phasor in the plurality of phasors comprising a corresponding amplitude and a corresponding angle indicative of a measured or assumed movement of the receiver in the first positioning direction;

providing a first correlation signal by correlating the first local signal with the first positioning signal; and providing motion compensation of at least one of the first local signal, the first positioning signal, or the first correlation signal based on the measured or assumed movement of the receiver in the first positioning direction by combining at least one of the first local signal, the first positioning signal or the first correlation signal with the plurality of phasors in such a manner as to provide preferential gain for a signal received in the first positioning direction in comparison with a signal received by the receiver in a second direction, which is not the line-of-sight direction from the first positioning source to the receiver.

16. The method of claim 15, wherein the positioning system is provided within a smartphone.

17. A non-transitory computer readable medium comprising executable instructions that when executed by a computer cause the computer to undertake steps that include:

providing a local frequency or phase reference using a local oscillator;

receiving, at a receiver, a first reference signal from a first reference source in a first reference direction, the first reference signal having a received frequency and a received phase, wherein the first reference source provides the first reference signal at a known or predictable frequency or phase;

receiving, at the receiver, a first positioning signal from a first positioning source in a first positioning direction, which is a line-of-sight direction from the first positioning source to the receiver;

providing a measured or assumed movement of the receiver in the first reference direction;

providing a movement of the first reference source in the first reference direction;

calculating a sequence of offsets to the received frequency or the received phase as a function of time, based on the measured or assumed movement of the receiver in the first reference direction and the movement of the first reference source in the first reference direction, wherein the sequence of offsets represents changes in behavior of the local oscillator over a period of time for coherent integration of the first positioning signal, thereby accounting for an error in the local frequency or phase reference provided by the local oscillator;

using the local frequency or phase reference from the local oscillator, and the sequence of offsets, to provide at least a first local signal;

providing a plurality of phasors, each phasor in the plurality of phasors comprising a corresponding amplitude and a corresponding angle indicative of a measured or assumed movement of the receiver in the first positioning direction;

providing a first correlation signal by correlating the first local signal with the first positioning signal; and providing motion compensation of at least one of the first local signal, the first positioning signal, or the first correlation signal based on the measured or assumed movement of the receiver in the first positioning direction by combining at least one of the first local signal, the first positioning signal or the first correlation signal with the plurality of phasors in such a manner as to provide preferential gain for a signal received in the first positioning direction in comparison with a signal received by the receiver in a second direction, which is not the line-of-sight direction from the first positioning source to the receiver.

18. The non-transitory computer readable medium of claim 17, wherein the first local signal is coherent with the first positioning signal over an integration period of at least one second.

19. The non-transitory computer readable medium of claim 17, wherein using the local frequency or phase reference from the local oscillator and the sequence of offsets to provide at least a first local signal comprises;

increasing a stability of the local oscillator.

20. The non-transitory computer readable medium of claim 17, wherein using the local frequency or phase reference from the local oscillator and the sequence of offsets to provide at least a first local signal comprises;

matching a stability of the local oscillator to a stability of the first reference signal.

\* \* \* \* \*